(12) United States Patent
Yuan et al.

(10) Patent No.: US 12,169,555 B2
(45) Date of Patent: Dec. 17, 2024

(54) PROGRAM CODE EXECUTION BEHAVIOR MONITORING METHOD AND COMPUTER DEVICE

(71) Applicant: Huawei Technologies Co., Ltd., Shenzhen (CN)

(72) Inventors: Jinfeng Yuan, Shenzhen (CN); Jia Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/889,153

(22) Filed: Aug. 16, 2022

(65) Prior Publication Data

US 2022/0391493 A1 Dec. 8, 2022

Related U.S. Application Data

(63) Continuation of application No. PCT/CN2020/119508, filed on Sep. 30, 2020.

(30) Foreign Application Priority Data

Feb. 17, 2020 (CN) .......................... 202010097557.7

(51) Int. Cl.
*G06F 21/00* (2013.01)
*G06F 21/53* (2013.01)

(52) U.S. Cl.
CPC ........ *G06F 21/53* (2013.01); *G06F 2221/034* (2013.01)

(58) Field of Classification Search
None
See application file for complete search history.

(56) References Cited

U.S. PATENT DOCUMENTS 6,192,512 B1 * 2/2001 Chess ................... G06F 21/566
714/38.12
9,280,347 B2 * 3/2016 Gschwind ............... G06F 9/342
(Continued)

FOREIGN PATENT DOCUMENTS

CN 101645119 B 5/2012
CN 107229863 A 10/2017
(Continued)

OTHER PUBLICATIONS

Sun et al., "Bringing Java's Wild Native World under Control," ACM Transactions on Information and System Security, vol. 16, No. 3, Article 9, Total 28 pages (Publication date: Nov. 2013).
(Continued)

*Primary Examiner* — Maung T Lwin
(74) *Attorney, Agent, or Firm* — Leydig, Voit & Mayer, Ltd.

(57) ABSTRACT

This application provides a program code execution behavior monitoring method. A computer device executes, in a virtual execution environment, first code corresponding to first program code, where the first code belongs to external code, the external code is code, other than internal code, invoked in the first program code, the external code includes system code provided by an operating system of the computer device, and the internal code is code of a process generated by the first program code. In a process of executing the first code, if second code belongs to the internal code, before execution of the second code is completed, the computer device switches an execution environment of the first program code to a simulated execution environment, where the second code is to-be-executed code. The computer device executes the second code in the simulated execution environment.

18 Claims, 13 Drawing Sheets

(56) References Cited

U.S. PATENT DOCUMENTS

| | | | |
|---|---|---|---|
| 10,592,678 B1* | 3/2020 | Ismael | G06F 21/62 |
| 11,250,126 B2* | 2/2022 | Strogov | G06F 21/554 |
| 2008/0127114 A1 | 5/2008 | Vasudevan | |
| 2008/0147353 A1* | 6/2008 | Ford | G06F 21/552 |
| | | | 702/179 |
| 2009/0241194 A1* | 9/2009 | Thomas | G06F 21/53 |
| | | | 718/1 |
| 2018/0275989 A1* | 9/2018 | Kakkad | G06F 11/3409 |
| 2019/0294798 A1 | 9/2019 | Jin et al. | |
| 2020/0026851 A1 | 1/2020 | Dhankha et al. | |

FOREIGN PATENT DOCUMENTS

| | | |
|---|---|---|
| CN | 107450962 A | 12/2017 |
| CN | 107808094 A | 3/2018 |
| CN | 109583190 A | 4/2019 |

OTHER PUBLICATIONS

Yan et al., "V2E: Combining Hardware Virtualization and Software Emulation for Transparent and Extensible Malware Analysis," VEE '12, Total 12 pages, London, England, UK (Mar. 3-4, 2012).

Payer "Safe Loading and Efficient Runtime Confinement: A Foundation for Secure Execution," A dissertation submitted to ETH Zurich, Diss. ETH No. 20442, Total 157 pages (2012).

* cited by examiner

PROGRAM CODE EXECUTION BEHAVIOR MONITORING METHOD AND COMPUTER DEVICE

CROSS-REFERENCE TO RELATED APPLICATIONS

This application is a continuation of International Application No. PCT/CN2020/119508, filed on Sep. 30, 2020, which claims priority to Chinese Patent Application No. 202010097557.7, filed on Feb. 17, 2020. The disclosures of the aforementioned applications are hereby incorporated by reference in their entireties.

TECHNICAL FIELD

This application relates to the computer field, and more specifically, to a program code execution behavior monitoring method and a computer device.

BACKGROUND

With the development of a computer technology, security of a computer becomes a focus of people's attention. With the development of an advanced persistent threat (APT) attack, advanced malicious code changes rapidly. Therefore, how to analyze program code to determine whether the program code is malicious program becomes a problem that needs to be resolved.

Techniques of analyzing program code are mainly classified into static program analysis and dynamic program analysis. The static program analysis is a technique of analyzing, without running the program code, a static feature and a functional module that are of the program code. A static program analysis technique is to analyze, for example, statistical properties of instructions and structural properties of code. However, the static program analysis can only identify known viruses or malicious code, and can detect neither variant or shelled malicious code nor unknown malicious code.

A dynamic analysis technique is a technique in which dynamic behavior features during running of the program code are collected and analyzed for detection when the program code is run. The dynamic analysis technique helps detect unknown malicious code or variants of malicious code. Therefore, the dynamic analysis technique is gradually accepted and adopted by security vendors. In a conventional technical solution, program code is run in a simulated execution environment constructed based on simulator software, and the program code is monitored. When the program code is run in the simulated execution environment, the simulator software first translates the program code and then the program code is run in a real hardware system. Therefore, the program code can be monitored at an instruction level in the simulated execution environment, but efficiency of system running is relatively low. In another conventional technical solution, program code is run in a virtual execution environment constructed based on a virtualization technology, and the program code is monitored. Because the program code does not need to be translated in the virtual execution environment, efficiency of system running is high, but the program code can only be monitored at a system call level.

SUMMARY

Embodiments of this application provide a program code execution behavior monitoring method and a computer device. Therefore, an objective of monitoring executed program code at an instruction level is implemented, and performance overheads can be reduced, so that running efficiency of a system is relatively high.

According to a first aspect, a program code execution behavior monitoring method is provided. The method includes: A computer device executes, in a virtual execution environment, first code corresponding to first program code. In a process of executing the first code, if second code belongs to internal code, before execution of the second code is completed, the computer device switches an execution environment of the first program code to a simulated execution environment, where the second code is to-be-executed code. The computer device executes the second code in the simulated execution environment.

The first code belongs to external code, the external code is code, other than the internal code, invoked in the first program code, the external code includes system code provided by an operating system of the computer device, and the internal code is code of a process generated by the first program code.

In the foregoing technical solution, when a dynamic execution environment can be created in a host system, two dynamic execution environments, namely, the simulated execution environment and the virtual execution environment, are simultaneously created. Internal code in program code is executed in the simulated execution environment, to monitor the internal code in the program code, and external code (such as system library code, kernel code, and other process code) in the program code is executed in the virtual execution environment. In this way, the program code can be monitored at an instruction level, and overall system performance overheads can be reduced.

In a possible implementation, before the computer device executes, in the virtual execution environment, the first code corresponding to the first program code, the method further includes:

In an initialization phase, the computer device configures an initial system status in the virtual execution environment, where the initial system status includes any one or more of the following: an initial value of a processor register, access permissions corresponding to memory spaces are all non-execute, or an initial state of a device input/output I/O.

In the initialization phase, the computer device initializes a simulation execution engine in the simulated execution environment, to enable the simulation execution engine to be in an initialized but not executed state.

In another possible implementation, the computer device monitors, in the simulated execution environment, behavior information of the second code in an execution process.

In the foregoing technical solution, when the internal code is loaded and executed, the execution environment is dynamically switched to the simulated execution environment for execution, and when execution of the internal code is completed, the execution environment is dynamically switched back to the virtual execution environment for execution. With on-demand dynamic switching between the two execution environments, it can be implemented that only the internal code is executed in the simulated execution environment, and the external code (such as system library code, kernel code, and other process code) in a virtual machine is executed in the virtual execution environment. In this way, an instruction-level monitoring capability of target program code can be implemented, and relatively low overall system performance overheads can be implemented.

In another possible implementation, the computer device determines, based on a page exception and a nested page table, that the second code belongs to the internal code.

the nested page table records access permissions corresponding to a first memory space, the second code is stored in the first memory space, and the page exception indicates conflict information between an access request for the first memory space and the access permissions corresponding to the first memory space.

In another possible implementation, the page exception is a first conflict exception. The computer device catches the first conflict exception, where the first conflict exception is sent when the access request for the first memory space is an execution request, and the access permissions corresponding to the first memory space that are recorded in the nested page table are non-write and non-execute. The computer device determines, based on the first conflict exception, that the second code belongs to the internal code.

In another possible implementation, the page exception is a second conflict exception. The computer device catches the second conflict exception, where the second conflict exception is sent when the access request for the first memory space is an execution request, and the access permissions corresponding to the first memory space that are recorded in the nested page table are write and non-execute. The computer device determines, based on the second conflict exception, that the second code belongs to either the internal code or the external code. The computer device determines, based on semantic information of the second code, that the second code belongs to the internal code.

In another possible implementation, the method further includes:

The computer device constructs the virtual execution environment by using a virtualization platform. The computer device constructs the simulated execution environment by using simulator software.

In another possible implementation, the simulator software is a quick emulator QEMU.

In another possible implementation, the virtualization platform is a kernel-based virtual machine KVM or Xen.

In another possible implementation, the method further includes: switching any one or more of the following content in the execution environment of the first program code: a context of a processor, memory access, or input/output I/O processing.

According to a second aspect, a computer device is provided, and includes:

a first execution module, adapted to execute, in a virtual execution environment, first code corresponding to first program code, where the first code belongs to external code; and the virtual execution environment is a running environment provided based on a virtualization technology, the external code is code, other than internal code, invoked in the first program code, the external code includes system code provided by an operating system of the computer device, and the internal code is code of a process generated by the first program code; and a switching module, adapted to: in a process of executing the first code, if second code belongs to the internal code, before execution of the second code is completed, switch an execution environment of the first program code to a simulated execution environment, where the simulated execution environment is a running environment provided based on a simulator, and the second code is to-be-executed code; and a second execution module, adapted to execute the second code in the simulated execution environment.

In a possible implementation, the method further includes:

a configuration module, adapted to configure an initial system status in the virtual execution environment in an initialization phase, where the initial system status includes any one or more of the following:

an initial value of a processor register, access permissions corresponding to memory spaces are all non-execute, or an initial state of a device input/output I/O, where the configuration module is further adapted to: in the initialization phase, initialize a simulation execution engine in the simulated execution environment, to enable the simulation execution engine to be in an initialized but not executed state.

In another possible implementation, the second execution module is further adapted to:

monitor, in the simulated execution environment, behavior information of the second code in an execution process.

In another possible implementation, the method further includes:

a determining module, adapted to determine, based on a page exception and a nested page table, that the second code belongs to the internal code.

the nested page table records access permissions corresponding to a first memory space, the second code is stored in the first memory space, and the page exception indicates conflict information between an access request for the first memory space and the access permissions corresponding to the first memory space.

In another possible implementation, the page exception is a first conflict exception. The determining module is specifically adapted to: catch the first conflict exception, where the first conflict exception is sent when the access request for the first memory space is an execution request, and the access permissions corresponding to the first memory space that are recorded in the nested page table are non-write and non-execute; and determine, based on the first conflict exception, that the second code belongs to the internal code.

In another possible implementation, the page exception is a second conflict exception. The determining module is specifically adapted to: catch the second conflict exception, where the second conflict exception is sent when the access request for the first memory space is an execution request, and the access permissions corresponding to the first memory space that are recorded in the nested page table are write and non-execute; determine, based on the second conflict exception, that the second code belongs to either the internal code or the external code; and determine, based on semantic information of the second code, that the second code belongs to the internal code.

In another possible implementation, the method further includes:

a creation module, adapted to construct the virtual execution environment by using a virtualization platform, where the creation module is further adapted to construct the simulated execution environment by using simulator software.

In another possible implementation, the simulator software is a quick emulator QEMU.

In another possible implementation, the virtualization platform is a kernel-based virtual machine KVM or Xen.

In another possible implementation, the switching module is further adapted to: switch any one or more of the following content in the execution environment of the first program code: a context of a processor, memory access, or input/output I/O processing.

According to a third aspect, a computer device is provided, and includes at least one processor and a memory, where the memory is adapted to store a computer program, and the at least one processor is adapted to invoke and run the computer program from the memory, to perform the method provided in any one of the first aspect or the possible implementations of the first aspect.

Optionally, in specific implementation, a quantity of processors is not limited. The processor is a general-purpose processor. Optionally, the general-purpose processor may be implemented by hardware or by software. When the processor is implemented by hardware, the processor is a logic circuit, an integrated circuit, or the like. When the processor is implemented by software, the processor is a general-purpose processor, and is implemented by reading software code stored in the memory. The memory is integrated into the processor, or located outside the processor and exists independently.

Specifically, the at least one processor is adapted to: execute, in a virtual execution environment, first code corresponding to the first program code, where the first code belongs to external code, the virtual execution environment is a running environment provided based on a virtualization technology, the external code is code, other than internal code, invoked in the first program code, the external code includes system code provided by an operating system of the computer device, and the internal code is code of a process generated by the first program code; in a process of executing the first code, if second code belongs to the internal code, before execution of the second code is completed, switch an execution environment of the first program code to a simulated execution environment, where the simulated execution environment is a running environment provided based on a simulator, and the second code is to-be-executed code; and execute the second code in the simulated execution environment.

In a possible implementation, before the at least one processor executes, in the virtual execution environment, the first code corresponding to the first program code, the at least one processor is further adapted to: in an initialization phase, configure, an initial system state in the virtual execution environment, where the initial system status includes any one or more of the following: an initial value of a processor register, access permissions corresponding to memory spaces are all non-execute, or an initial state of a device input/output I/O. In the initialization phase, the computer device initializes a simulation execution engine in the simulated execution environment, to enable the simulation execution engine to be in an initialized but not executed state.

In another possible implementation, the at least one processor is further adapted to monitor, in the simulated execution environment, behavior information of the second code in an execution process.

In another possible implementation, before the execution of the second code is completed, the at least one processor is further adapted to determine, based on a page exception and a nested page table, that the second code belongs to the internal code, where the nested page table records access permissions corresponding to a first memory space, the second code is stored in the first memory space, and the page exception indicates conflict information between an access request for the first memory space and the access permissions corresponding to the first memory space.

In another possible implementation, the page exception is a first conflict exception. The at least one processor is specifically adapted to: catch the first conflict exception, where the first conflict exception is sent when the access request for the first memory space is an execution request, and the access permissions corresponding to the first memory space that are recorded in the nested page table are non-write and non-execute; and determine, based on the first conflict exception, that the second code belongs to the internal code.

In another possible implementation, the page exception is a second conflict exception. The at least one processor is specifically adapted to: catch the second conflict exception, where the second conflict exception is sent when the access request for the first memory space is an execution request, and the access permissions corresponding to the first memory space that are recorded in the nested page table are write and non-execute; determine, based on the second conflict exception, that the second code belongs to either the internal code or the external code; and determine, based on semantic information of the second code, that the second code belongs to the internal code.

In another possible implementation, the at least one processor is further adapted to: construct the virtual execution environment by using a virtualization platform; and construct the simulated execution environment by using simulator software.

In another possible implementation, the simulator software is a quick emulator QEMU.

In another possible implementation, the virtualization platform is a kernel-based virtual machine KVM or Xen.

In another possible implementation, the at least one processor is further adapted to: switch any one or more of the following content in the execution environment of the first program code: a context of a processor, memory access, or input/output I/O processing.

According to a fourth aspect, a computer program product is provided. The computer program product includes computer program code. When the computer program code is run on a computer, the computer is enabled to perform the method in any one of the first aspect or the possible implementations of the first aspect.

According to a fifth aspect, a computer-readable storage medium is provided. The computer-readable storage medium stores computer program code. When the computer program code is run on a computer, the computer is enabled to perform the method in any one of the first aspect or the possible implementations of the first aspect. The computer-readable storage device includes but is not limited to one or more of the following: a read-only memory (ROM), a programmable ROM (PROM), an erasable PROM (EPROM), a flash memory, an electrical EPROM (EEPROM), or a hard drive.

According to a sixth aspect, a chip is provided. The chip includes a processor and a data interface, and the processor reads, by using the data interface, instructions stored in a memory, to perform the method in any one of the first aspect or the possible implementations of the first aspect.

In a specific implementation process, the chip may be implemented in a form of a central processing unit (CPU), a micro controller unit (MCU), a micro processing unit (MPU), a digital signal processing (DSP), a system-on-a-chip (SoC), an application-specific integrated circuit (ASIC), a field programmable gate array (FPGA), or a programmable logic device (PLD).

Optionally, in specific implementation, a quantity of processors is not limited. The processor is a general-purpose processor. Optionally, the general-purpose processor may be implemented by hardware or by software. When the processor is implemented by hardware, the processor is a logic circuit, an integrated circuit, or the like. When the processor is implemented by software, the processor is a general-purpose processor, and is implemented by reading software code stored in the memory. The memory is integrated into the processor, or located outside the processor and exists independently.

DESCRIPTION OF EMBODIMENTS

The following describes technical solutions in embodiments of this application with reference to the accompanying drawings.

First, a computer device 100 to which a program code execution behavior monitoring method in the embodiments of this application is applicable is described in detail with reference to FIG. 1.

The computer device may also be referred to as a computer system, and may include a hardware layer, an operating system layer that runs above the hardware layer, and an application layer that runs above the operating system layer. The hardware layer includes hardware such as a processing unit, a memory, and a memory control unit. Subsequently, functions and structures of the hardware are described in detail. An operating system corresponding to the operating system layer is any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, in this embodiment of this application, optionally, the computer system is a handheld device such as a smartphone, or a terminal device such as a personal computer. This is not particularly limited in this application, provided that a program that records code of the program code execution behavior monitoring method in this embodiment of this application can be run, to monitor a loaded sample program according to the program code execution behavior monitoring method according to this embodiment of this application. The program code execution behavior monitoring method in this embodiment of this application is executed by a computer system, or is a functional module that can invoke a program and execute the program in the computer system.

In this embodiment of this application, the program is a set of ordered instructions (or code) used to implement a relatively independent function. The program is usually designed through modularization; to be specific, a function of the program is detailed and decomposed into a plurality of smaller functional modules. The program includes at least one function, and the function is a code segment for implementing one functional module. Therefore, a function is a basic unit of functional modularization of a program, and optionally, the function is also considered a subprogram.

Figure 1:
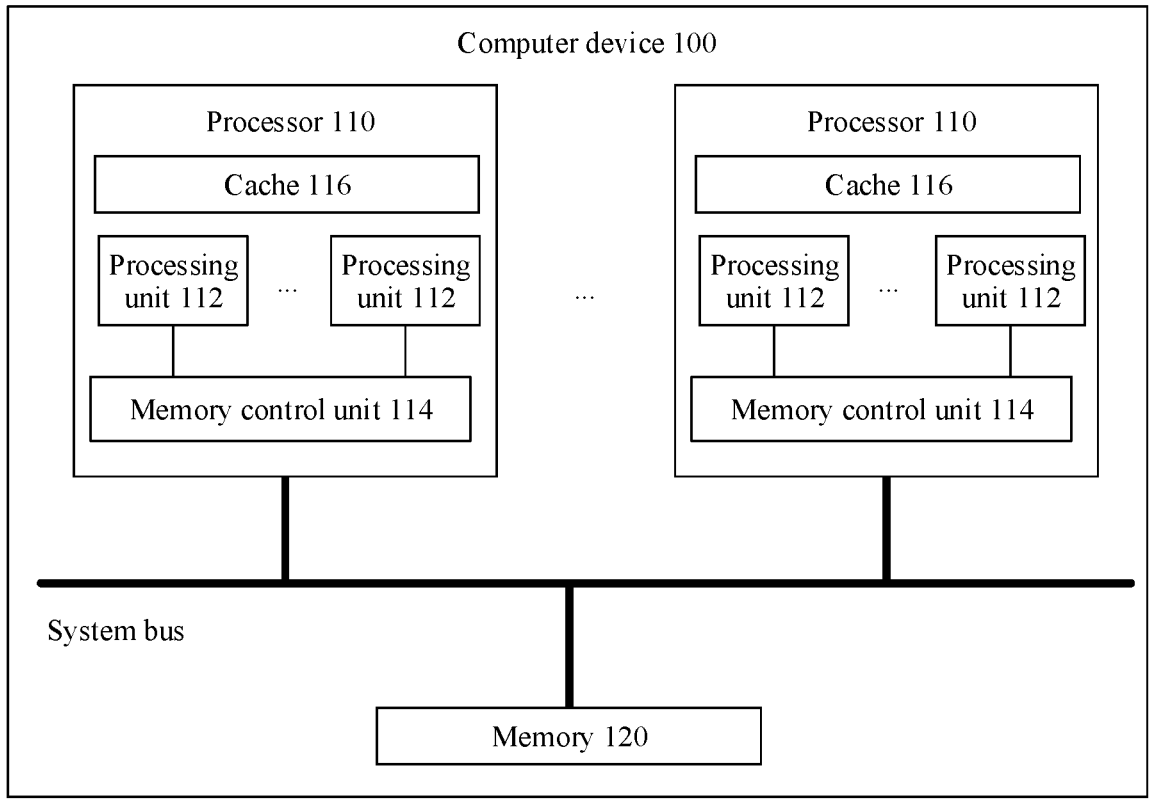
FIG. 1 is a schematic architectural diagram of a computer device 100 according to an embodiment of this application.

FIG. 1 is a schematic architectural diagram of a computer device 100 according to an embodiment of this application. The computer device 100 shown in FIG. 1 that is used to execute a program code execution behavior monitoring method executed by a computer device includes at least one processor 110 and a memory 120.

Optionally, the computer device 100 may further include a system bus, and the processor 110 and the memory 120 each are connected to the system bus. The processor 110 can access the memory 120 by using the system bus. For example, the processor 110 can read and write data or execute code in the memory 120 by using the system bus. The system bus is a peripheral component interconnect express (PCIe) bus, an extended industry standard architecture (EISA) bus, or the like. The system bus is classified into an address bus, a data bus, a control bus, and the like. For ease of representation, only one thick line is used to represent the bus in FIG. 1, but this does not mean that there is only one bus or only one type of bus.

A function of the processor 110 is mainly to explain instructions (or code) of a computer program and process data in computer software. The instructions of the computer program and the data in the computer software may be stored in the memory 120 or a cache unit 116.

In this embodiment of this application, the processor 110 may be an integrated circuit chip and has a signal processing capability. As an example rather than a limitation, the processor 110 may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor is a microprocessor or the like. For example, the processor 110 is a central processing unit (CPU).

Each processor 110 includes at least one processing unit 112 and a memory control unit 114.

Optionally, the processing unit 112 is also referred to as a core or a kernel, and is a most important component of the processor. The processing unit 112 may be made from monocrystalline silicon by using a specific production process, and all calculation, acceptance commands, storage commands, and data processing of the processor are executed by the core. The processing unit can independently run program instructions, and increase a running speed of a program by using a parallel computing capability. Various processing units have fixed logical structures. For example, the processing unit includes logical units such as a level 1 cache, a level 2 cache, an execution unit, an instruction-level unit, and a bus interface.

The memory control unit 114 is adapted to control data exchange between the memory 120 and the processing unit 112. Specifically, the memory control unit 114 receives a memory access request from the processing unit 112, and controls access to the memory based on the memory access request. As an example rather than a limitation, in this embodiment of this application, the memory control unit is a device such as a memory management unit (MMU).

In this embodiment of this application, each memory control unit 114 performs addressing for the memory 120 by using the system bus. In addition, an arbiter (which is not shown in the figure) is configured in the system bus, and the arbiter is responsible for processing and coordinating contention access of a plurality of processing units 112.

In this embodiment of this application, the processing unit 112 and the memory control unit 114 are communicatively connected by using a connection line such as an address line inside a chip, to implement communication between the processing unit 112 and the memory control unit 114.

Optionally, each processor 110 further includes the cache unit 116, and a cache is a data exchange buffer (referred to as a cache). When the processing unit 112 needs to read data, the processing unit 112 first searches the cache for required data. If the data is found, the processing unit 112 directly reads the data; if the data is not found, the processing unit 112 searches the memory for the data. Because the cache runs much faster than the memory, a function of the cache is to help the processing unit 112 run faster.

The memory 120 can provide a running space for a process in the computer device 100. For example, the memory 120 stores a computer program (specifically, program code) used to generate the process. After the computer program is run by the processor to generate the process, the processor allocates a corresponding storage space to the process in the memory 120. Further, the storage space further includes a text segment, an initial data segment, a bit initial data segment, a stack segment, a heap segment, and the like. The memory 120 stores, in the storage space corresponding to the foregoing process, data generated during running of the process, for example, intermediate data or process data.

Optionally, the memory is also referred to as an internal memory, and a function of the memory is adapted to temporarily store operation data in the processor 110 and data exchanged with an external memory such as a hard disk. As long as the computer is running, the processor 110 invokes data that needs to be operated to the memory for operation, and the processing unit 112 sends a result after the operation is completed.

As an example rather than a limitation, in this embodiment of this application, the memory 120 is a volatile memory or a non-volatile memory, or may include both a volatile memory and a non-volatile memory. The non-volatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory 120 of the systems and methods described in this specification includes but is not limited to these or any memory of another proper type.

It should be understood that a structure of the foregoing enumerated computer device 100 is merely an example for description, and this is not limited in this application. The computer device 100 in this embodiment of this application includes various hardware in a computer system in a conventional technology. For example, the computer device 100 further includes a memory other than the memory 120, such as a magnetic disk memory.

In a possible implementation of this embodiment of this application, at least one operating system is simultaneously run on the computer device 100 by using simulator software, and a plurality of programs are run within each operating system. The operating system running on the computer device 100 can provide an execution environment for program code. For ease of description, the execution environment is referred to as a simulated execution environment.

There are various types of simulator software, and any program software that uses a dynamic binary conversion technology to implement software simulation or emulation that are of hardware such as a processor and a memory can be considered as simulator software. For example, the simulator software is Bochs, VirtualBox, VMware, and a quick emulator (QEMU).

Specifically, the QEMU is used as an example. In this embodiment of this application, the QEMU can simulate the hardware such as the processor and the memory by performing dynamic binary conversion. The QEMU simulates an entire hardware system. Therefore, in a process of executing the program code, the QEMU first performs instruction translation on to-be-executed program code of a guest virtual machine, and then the program code is run in a real hardware system. For example, the QEMU performs binary instruction translation on the program code to be executed, to be specific, converts the program code into intermediate instructions with lower semantics, and then generates instruction execution code of a platform corresponding to a host. When the translated code is executed, a process of executing binary translation is completed.

In another possible implementation of this embodiment of this application, optionally, a virtualization technology can be further applied to the computer device 100. A plurality of virtual machines are simultaneously run on the computer device 100 by using the virtualization technology. At least one operating system runs within each virtual machine, and a plurality of programs are run within each operating system.

The virtual machine running on the computer device 100 provides an execution environment for program code. For ease of description, the execution environment is referred to as a virtual execution environment.

There are a plurality of virtualization technologies. The virtualization technology applicable to this embodiment of this application is a hardware-accelerated virtualization technology. A virtual machine monitor (VMM) is responsible for completing resource virtualization by using a virtualization capability provided by hardware. For example, a kernel virtual machine (KVM) implements virtualization of an entire system resource by using a hardware-assisted virtualization technology such as VT-d/VT-x in an Intel processor. Therefore, execution efficiency and performance of the virtualization technology of this type are relatively high. In addition, Xen, Hyper-V, and the like are representatives of the virtualization technology of this type.

It should be understood that, a virtualization technology is a resource management technology, and various physical resources of a computer, such as a server, a network, a memory, and storage, are abstracted, converted, and presented, to break a barrier of indivisibility of physical structures, and enable users to apply the resources in a better way than the resources would otherwise be. Virtual parts of the resources are not limited by a setting manner, a location, or a physical configuration of the existing resources.

With the development of a computer technology, security of a computer becomes a focus of people's attention. With continuous development of advanced persistent threat (APT) attacks, advanced malicious code is also advancing rapidly, and it is increasingly difficult for conventional static malicious code detection that is based on a feature code matching technology to deal with the advanced malicious code. A detection technology based on a dynamic behavior feature during program running is gradually accepted and adopted by security vendors. It is proved by practice that a sandbox is an effective system for detecting malicious code based on dynamic behavior monitoring. An isolated real running environment is constructed, and all behavior of a sample program (specifically, a process generated by a sample process) during execution are monitored and recorded, and submitted to a back-end analysis engine for analysis, to determine whether code of the sample program is malicious code.

Due to widespread use of a sandbox system, an anti-sandbox-monitoring technology is correspondingly added to the advanced malicious code. For example, malicious code detects an execution environment during initial running to determine whether the code is running in the sandbox system. If the code is running in the sandbox system, the program directly terminates, to avoid behavior monitoring of the sandbox system. In addition, the malicious code destroys a behavior monitoring mechanism of the sandbox system, causing sandbox monitoring to fail. Therefore, a set of effective sandbox system needs to have very strong anti-detection and anti-damage capabilities. Finally, with a rapid increase in a quantity of sample programs, to cope with analysis tasks of a huge quantity of sample programs of a user, the sandbox system needs to have a high-performance monitoring capability, and overheads caused by behavior monitoring need to be very low, to support large-scale concurrent monitoring.

The computer device 100 shown in FIG. 1 is a host on which a sandbox system is located. A virtual machine that runs on the computer device 100 provides a running environment of a sample program, and monitors, by using a VMM or a monitor program that runs on a secure virtual machine, an access behavior of a target process generated by the sample program. A deployment location of the computer device 100 is not specifically limited in this embodiment of this application.

Figure 3:
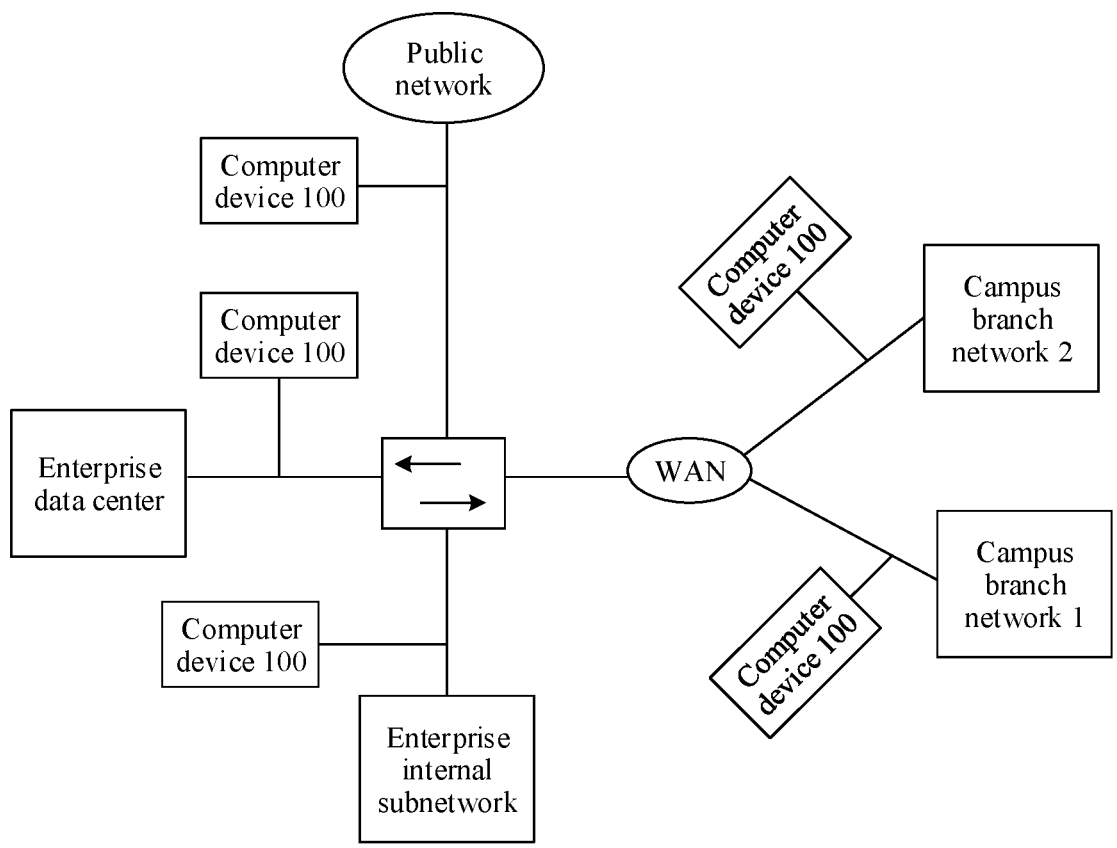
FIG. 3 is a schematic diagram of network deployment of a computer device 100 according to an embodiment of this application.

In an example, refer to FIG. 3. The computer device 100 is deployed at an entry point of each core network, serves as a bypass device, detects behavior of unknown program code of each core network, and provides a detection result. When off-path deployment is performed on the computer device 100, a forwarding device (not shown in FIG. 3) on a traffic forwarding path of a device such as a switch, a router, or a firewall mirrors traffic passing through the forwarding device, and sends mirrored traffic to the computer device 100 on which the off-path deployment is performed. For example, the computer device 100 is located at a public network boundary. For another example, the computer device 100 is located at an ingress of a campus branch network. For another example, the computer device 100 is located at an ingress of an internal subnet of an enterprise. For another example, the computer device 100 is located at an ingress of a data center (DC) server of an enterprise.

Figure 4:
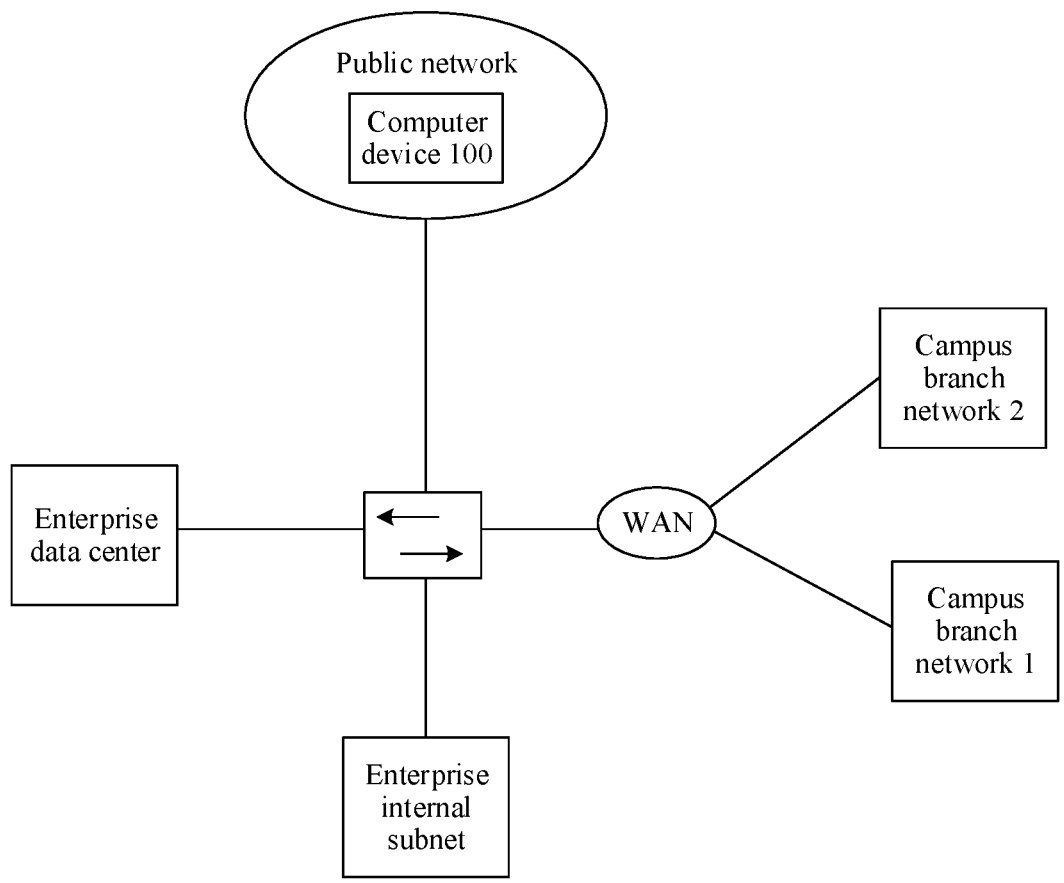
FIG. 4 is a schematic diagram of network deployment of another computer device 100 according to an embodiment of this application.

In another example, refer to FIG. 4. In a cloud scenario, the computer device 100 serves as a server in the internet, provides a service interface by using a web user interface (WUI) or the like, receives an unknown program provided by a device such as a personal computer or another gateway (for example, an ingress gateway of a campus branch network, an ingress gateway of an internal subnet of an enterprise, and an ingress gateway of a DC server of an enterprise), and detects program code behavior of the unknown program. Optionally, the computer device 100 further sends, based on a configuration, a detection result of the unknown program to the device that submits the unknown program, or sends a detection result of the unknown program to a third-party device. The third-party device herein refers to a device other than the computer device 100 and the device that submits the unknown program.

A sandbox system running in a simulated execution environment is used as an example. In the process of executing the program code, the simulator software needs to perform the instruction translation on the to-be-executed program code of the guest virtual machine, and then the program code is run in the real hardware system. Therefore, in a process of executing the instruction translation, the simulator software monitors execution of the program code of guest virtual machine by adding monitoring code. For example, in a process in which the QEMU translates guest instructions, additional monitoring code is added. When a translated host code block is executed, the monitoring code is also executed, to record real-time dynamic behavior information. A sandbox for dynamic behavior monitoring based on the simulated execution environment has an instruction-level behavior monitoring capability, is completely transparent to monitored samples, and has strong anti-evasion and anti-damage capabilities. However, because the instruction translation needs to be performed on the to-be-executed program code of the guest virtual machine and then the program code is executed, system running efficiency is relatively low.

A sandbox system running in the virtual execution environment is used as an example. In a process of executing the program code, the program code is directly executed on real hardware. A sandbox system for dynamic behavior monitoring based on the virtual execution environment deploys monitoring code at a VMM layer. Based on the VMM, the sandbox system may modify start instructions of a target monitoring function and use interrupt instructions of the target monitoring function for replacement. When the program code is run on the real hardware and calls the target function, an interruption exception that traps into the VMM is triggered.

The monitoring code can monitor, in the VMM, that the target function is called, to implement behavior monitoring at an application programming interface (API) level on the program code. Because the instruction translation does not need to be performed on the to-be-executed program code of the guest virtual machine, system running efficiency is relatively high. However, the sandbox system running in the virtual execution environment can only perform API-level behavior monitoring on the to-be-executed program code of the guest virtual machine, but cannot perform instruction-level behavior monitoring on the program code, and a monitoring capability is relatively low.

According to the technical solutions provided in this embodiment of this application, all behavior information in an execution process of the program code to be executed can be monitored and recorded, including all instruction sequences during execution of the program code, data information carried in the instruction sequences, and semantic information (for example, a function call name, parameter data for function call, and a return value). In addition, the technical solutions provided in this embodiment of this application can further implement relatively low performance overheads, so that system running efficiency is relatively high.

For ease of description of this solution, the following first describes in detail program code executed in the embodiments of this application.

FIG. 4 is a schematic diagram of classification of program code stored in a memory according to an embodiment of this application. Refer to FIG. 4. In the embodiments of this application, code stored in a memory is classified into two types: internal code and external code. Optionally, the internal code is also referred to as target code, and the external code is also referred to as non-target code.

It should be understood that the internal code and the external code are relative to a process generated by a program.

For the process, the internal code refers to code of the program that generates the process, belongs to the process, is code that is not shared with another process, and is used to implement a logical function of the process. For example, the internal code is a segment (usually a TEXT segment) that has executable attributes in a PE file of a Windows process. T1 is used to represent a code segment of a process 1. An internal code set Tall of all processes running in a system is {T1, T2, . . . , Tn}, and n represents a quantity of the processes running in the system. For a malicious sample program, internal code that includes a malicious sample to implement malicious behavior needs to be monitored by the sandbox system.

The external code is global code shared by all processes. For example, the external code includes user shared code and system kernel code. As an example instead of a limitation, in the embodiments of this application, the external code occupies only one space of a memory. Each process maps shared physical memories to a virtual address space of the process through virtual memory mapping, to implement shared use.

The user shared code, also referred to as system shared library code, is a type of code provided by an operating system to implement a specific system service function. All processes in the system share the code, and the operating system is responsible for mapping the code to specific process address spaces. For example, the code is kernel32.dll and user32. dll in the Windows operating system and c run-time library libc.so in the Linux operating system. The program calls a library function to execute the user shared code to obtain a service provided by the system.

The system kernel code includes but is not limited to operating system kernel code, device driver code, or the like. The system kernel code is responsible for providing a core service function of a system, such as process scheduling or device operation. All processes share the same kernel code and request a service through a system call.

Figure 2:
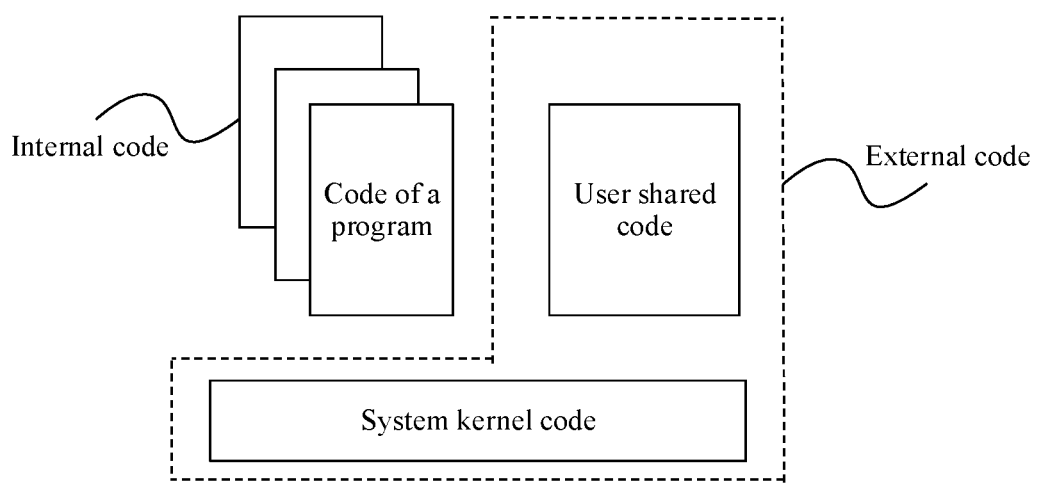
FIG. 2 is a schematic diagram of classification of program code stored in a memory according to an embodiment of this application.

In this embodiment of this application, in an execution process of the program, an execution flow of the program is switched for a plurality of times in the code shown in FIG. 2. For example, after code of the program calls the library function, the execution flow jumps to a system library code segment, and after the library function call returns, the execution flow returns to a code segment of the program; after code of the program invokes the system call, the execution flow jumps to a system kernel code segment, and after the system call returns, the execution flow returns to a code segment of the program.

In the technical solutions provided in this embodiment of this application, when a dynamic execution environment is created in a host system, two dynamic execution environments, namely, the simulated execution environment and the virtual execution environment, are simultaneously created. The internal code of the program code to be executed is loaded and executed in the simulated execution environment, a monitor program is deployed in the simulated execution environment (in other words, the sandbox system is deployed in the simulated execution environment), and the internal code is monitored through the monitor program. The external code (such as system library code, kernel code, and other process code) of the program code to be executed is loaded and executed in the virtual execution environment. Because the external code belongs to a normal service function of the system and does not include the malicious behavior, the external code executed in the virtual execution environment does not need to be monitored. In this way, instruction-level monitoring on internal code can be implemented, and overall system performance overheads can be reduced.

Specifically, in this embodiment of this application, monitoring behavior of the internal code in the simulated execution environment includes but is not limited to: monitoring all execution instruction data information in the internal code, for example, monitoring an instruction sequence generated when the execution flow of the program is executed in the internal code, and data flow information carried in the instruction sequence; or monitoring all library functions called during execution of the internal code and system call information. For example, the internal code calls a CreateFile function in kernel32. dll to create a new file. In this embodiment of this application, a name of the library function, parameter data of the function call, a return value, and the like can be recorded.

Figure 5:
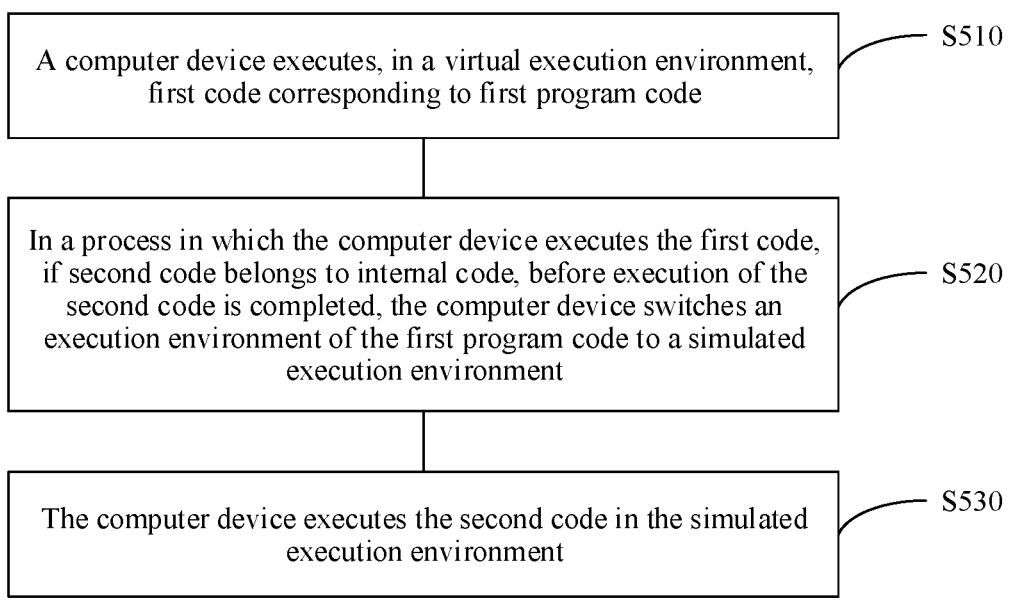
FIG. 5 is a schematic flowchart of a program code execution behavior monitoring method according to an embodiment of this application.

With reference to FIG. 5, the following describes in detail a program code execution behavior monitoring method provided in an embodiment of this application.

FIG. 5 is a schematic flowchart of a program code execution behavior monitoring method according to an embodiment of this application. As shown in FIG. 5, the method includes steps 510 to 530. The following separately describes steps 510 to 530 in detail.

Step 510: A computer device executes, in a virtual execution environment, first code corresponding to first program code.

In this embodiment of this application, the first code belongs to external code, and is code, other than internal code, invoked in the first program code. The external code includes global code shared by all processes. For example, the external code includes user shared code and system code provided by an operating system of the computer device. The internal code is code of a process that is generated by the first program code, is used to implement a logical function of the process, and is code that is not shared with another process. For details, refer to description about the external code and the internal code in FIG. 2. Details are not described herein again.

The virtual execution environment is a complete computer system that is implemented by using a virtualization technology, that has complete hardware system functions, and that runs in a completely isolated environment. For details, refer to the foregoing description. Details are not described herein again.

Optionally, before step 510, the computer device further performs an initialization process. Specifically, in an initialization phase, the computer device configures an initial system status in the virtual execution environment, where the initial system status includes any one or more of the following: an initial value of a processor register, access permissions corresponding to memory spaces are all non-execute, or an initial state of a device input/output I/O. The computer device further initializes a simulation execution engine in a simulated execution environment, to enable the simulation execution engine to be in an initialized but not executed state.

Step 520: In a process in which the computer device executes the first code, if second code belongs to the internal code, before execution of the second code is completed, the computer device switches an execution environment of the first program code to the simulated execution environment.

The second code is to-be-executed code in a process of executing the first code.

The simulated execution environment is a complete computer system that is simulated by simulator software, that has complete hardware system functions, and that runs in a completely isolated environment. For details, refer to the foregoing description. Details are not described herein again.

Optionally, in some embodiments, before the execution of the second code is completed, the computer device further determines, based on a page exception and a nested page table, that the second code belongs to the internal code. The nested page table records access permissions corresponding to a storage space that stores the second code, and the page exception indicates conflict information between an access request for the storage space that stores the second code and the access permission corresponding to the storage space. For details, refer to description in FIG. 6 to FIG. 8 below. Details are not described herein.

In this embodiment of this application, there are a plurality of implementations in which the computer device determines, based on the page exception and the nested page table, that the second code belongs to the internal code. In a possible implementation, if the access request for the first memory space is an execution request, and the access permissions corresponding to the first memory space that are recorded in the nested page table are non-write and non-execute, the computer device determines that the second code belongs to the internal code. In another possible implementation, if the access request for the first memory space is an execution request, and the access permissions corresponding to the first memory space that are recorded in the nested page table are write and non-execute, the computer device determines that the second code belongs to either the internal code or the external code, and determines that the second code belongs to the internal code based on semantic information of the second code. For a specific implementation, refer to the following description in FIG. 12A, FIG. 12B, and FIG. 12C. Details are not described herein.

Step 530: The computer device executes the second code in the simulated execution environment.

Specifically, the computer device monitors, in the simulated execution environment, behavior information of the second code in an execution process.

In the foregoing technical solution, when a dynamic execution environment is created in a host system, two dynamic execution environments, namely, the simulated execution environment and the virtual execution environment, are simultaneously created. Internal code in program code is executed in the simulated execution environment, to monitor the internal code in the program code, and external code (such as system library code, kernel code, and other process code) in the program code is executed in the virtual execution environment. In this way, the program code can be monitored at an instruction level, and overall system performance overheads can be reduced.

Optionally, in some embodiments, a system is initially executed in the virtual execution environment. When the internal code is loaded and executed, the system is dynamically switched to the simulated execution environment for execution, and when execution of the internal code is completed, the system is dynamically switched back to the virtual execution environment for execution. With on-demand dynamic switching between the two execution environments, it can be implemented that only the internal code is executed in the simulated execution environment, and the external code (such as the system library code, the kernel code, and other process code) in a virtual machine is executed in the virtual execution environment. In this way, instruction-level monitoring on the internal code can be implemented, and relatively low overall system performance overheads can be implemented.

Figure 6:
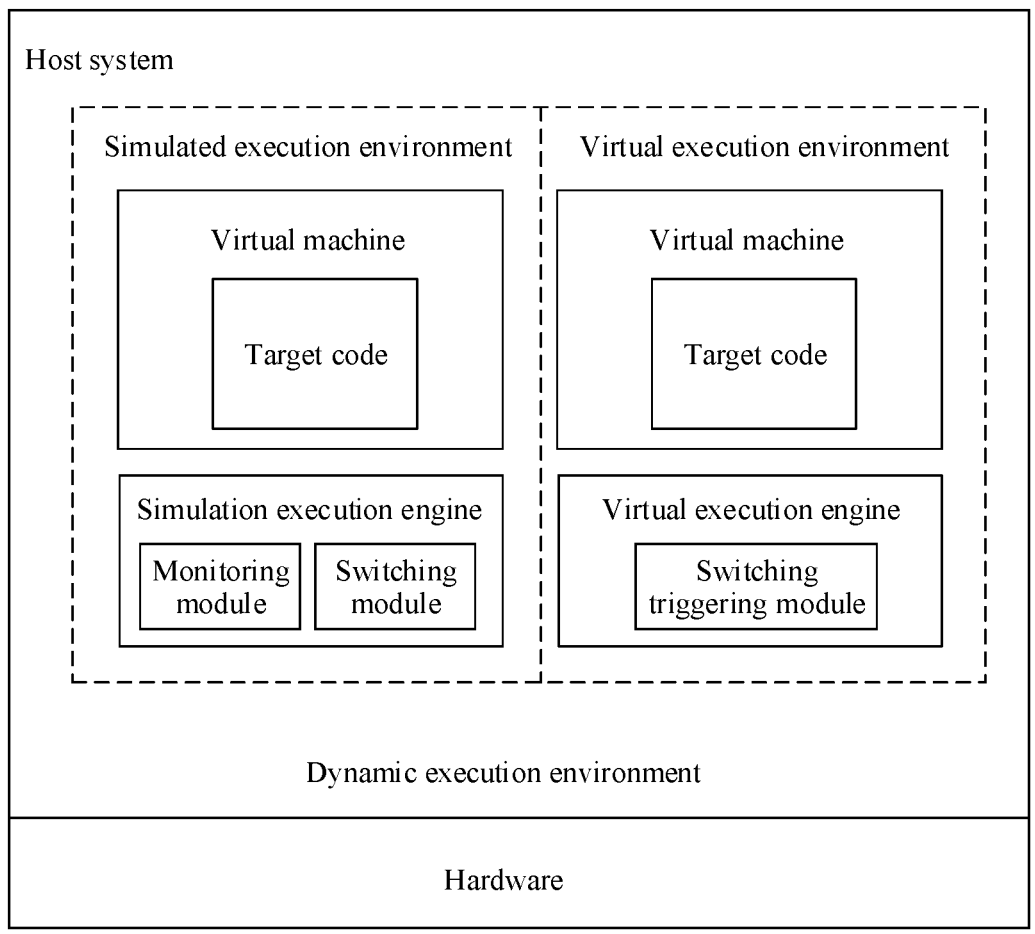
FIG. 6 is a schematic architectural diagram of a system according to an embodiment of this application.

Specifically, FIG. 6 is used as an example. The two dynamically created execution environments are the virtual execution environment and the simulated execution environment. The virtual execution environment includes a switching triggering module, and the simulated execution environment includes a switching module and a monitoring module. For hardware in an architecture shown in FIG. 6, refer to the description of the computer device 100 in FIG. 1. Details are not described herein again.

The following separately describes in detail a switching triggering module, a switching module, and a monitoring module shown in FIG. 6.

(1) Switching Triggering Module

The switching triggering module is located in a virtual execution engine in the virtual execution environment, and is responsible for catching a moment when the internal code is being or to be executed in the virtual execution environment. When the switching triggering module catches the moment and determines that code being or to be executed is the internal code, the switching triggering module instructs the switching module to switch to a heterogeneous environment, to be specific, switch to the simulated execution environment for execution. Specifically, in an example, the switching triggering module determines whether program code being executed is the internal code, and if the program code is the internal code, the switching triggering module instructs the switching module to switch to the heterogeneous environment. In another example, the switching triggering module further instructs the switching module to switch to the heterogeneous environment at a moment when the internal code in the program code is about to be executed, for example, when the internal code is initially loaded and to be executed, or when the internal code continues to be executed after termination of calling an external library function by the internal code.

Optionally, a page exception is generated by hardware. When a processor executes an instruction (for example, the first code or the second code mentioned above), if the instruction is related to a memory read/write operation, and the operation causes a conflict with a permission flag in an extended page table (EPT), the processor generates the page exception, and the page exception is then sent to a hypervisor (also referred to as a VMM). In other words, an instruction register (such as an EIP register) of the current processor is modified, and an exception handler set by the hypervisor is executed, so that a switching triggering module in the hypervisor can catch the exception.

Optionally, as an example, in this embodiment of this application, the switching triggering module determines, by using a nested page table and the page exception, that program code that is being executed or is about to be executed is the internal code. The nested page table and page exception are described in detail below.

Optionally, a physical computer in which a virtual machine runs is referred to as a host, and a physical address of a memory of the host is referred to as a host physical address (HPA). An operating system in which a virtual machine runs is referred to as a guest. When a process on a guest runs, a guest virtual address (GVA) may be assigned to the process.

Figure 7:
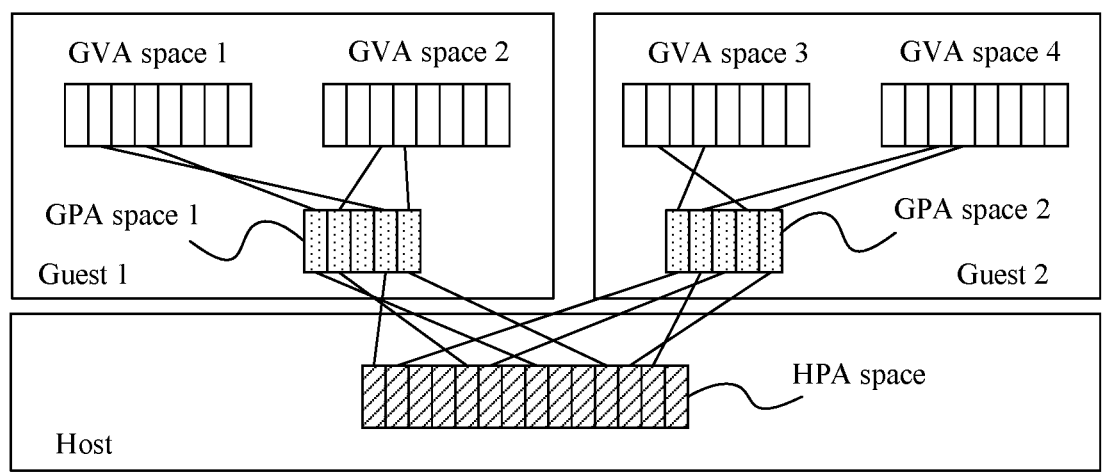
FIG. 7 is a schematic diagram of a virtualization logical architecture of a computer device that is applicable to an embodiment of this application.

As shown in FIG. 7, in the embodiments of this application, to enable a guest to use an isolated and continuous memory space starting from zero, a concept of a guest physical address (GPA) is introduced. The address space is not a real physical address space. For the guest, the guest physical address space is a continuous address space starting from zero. However, for the host, the guest physical address space is not necessarily continuous, and may be mapped to several discontinuous host physical address intervals. Therefore, to enable a process in a guest to access the memory of the host, a mapping from a GVA to a GPA and then to an HPA, namely, address translation, needs to be implemented.

Figure 8:
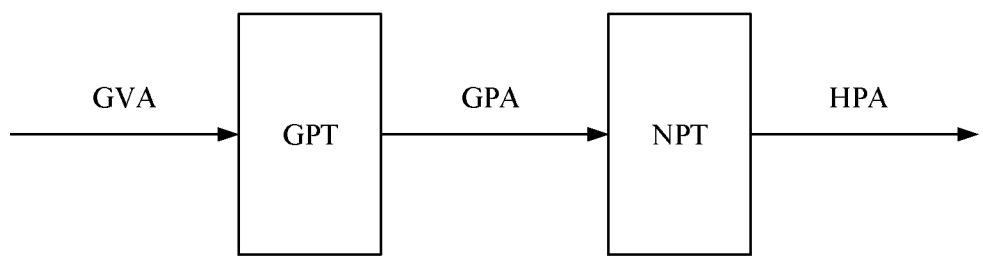
FIG. 8 is a schematic diagram of a memory addressing process based on the logical architecture shown in FIG. 7.

Optionally, FIG. 8 shows an implementation of the address translation. In this embodiment of this application, a guest page table (GPT) and a nested page table (NPT) are configured. Specific representations of the nested page table in different architectures are different. A platform architecture is not further limited in this embodiment of this application. For example, in an x86 architecture, the nested page table is an extended page table (EPT). For another example, in an ARM architecture of an ARM company, the nested page table is a stage-2 page-table.

It should be understood that a page table is a management mode of an address space. For details, refer to description in related documents. Details are not described herein.

The GPT is maintained by a guest, and the nested page table (for example, the EPT) is maintained by virtualization software on a host, for example, a VMM running on the host. The VMM is also referred to as a hypervisor. A target process generated by a sample program is run on a virtual machine. A monitor program runs outside the virtual machine (for example, on another virtual machine). The monitor program is responsible for monitoring and recording a behavior of the sample program (or the target process) in an execution process.

Specifically, for example, when a process (denoted as a process #X) in the virtual machine needs to access a host physical address space (denoted as a host physical space #X) in a memory of the host, and a virtual address (which corresponds to the host physical space #X) that is assigned by the virtual machine to the process #X is a GVA #X, the guest determines, based on the GPT, a GPA (denoted as a GPA #X) corresponding to the GVA #X. Further, a memory control unit MMU of the host determines, based on the EPT, an HPA (denoted as an HPA #X) corresponding to the GPA #X, to complete access to a memory space corresponding to the HPA #X. The VMM in the host may record a behavior that the target process accesses the memory.

In this embodiment of the present disclosure, the nested page table is similar to a conventional host page table. The nested page table not only records a mapping relationship between a GPA and an HPA, but also can record some access permission flag bits, to control access permissions of a guest virtual machine to a specific physical page.

As an example instead of a limitation, in the embodiments of this application, the access permission includes three types: a read access permission, a write access permission, and an execution access permission. Correspondingly, in the EPT, three fields are set for a memory space indicated by an HPA, to respectively indicate specific states of the three permissions.

For example, a field #0 is used to carry a bit (denoted as a bit #0) that indicates the read access permission, and the bit #0 is used to indicate whether the memory space (specifically, data in the memory space) corresponding to the HPA (or a GPA) is allowed to be read by the guest. The bit #0 includes one or more bits. This is not specifically limited in this application, provided that the foregoing processing unit 112 and the foregoing memory control unit 114 can agree on explanations of different values of the bit #0. For example, when the bit #0 is "0", it indicates that the memory space is not allowed to be read by the guest. For another example, when the bit #0 is "1", it indicates that the memory space is allowed to be read by the guest.

For another example, a field #1 is used to carry a bit (denoted as a bit #1) that indicates the write access permission, and the bit #1 is used to indicate whether the memory space corresponding to the HPA (or a GPA) is allowed to be written by the guest. The bit #1 includes one or more bits. This is not specifically limited in this application, provided that the foregoing processing unit 112 and the foregoing memory control unit 114 can agree on explanations of different values of the bit #1. For example, when the bit #1 is "0", it indicates that the memory space is not allowed to be written by the guest. For another example, when the bit #1 is "1", it indicates that the memory space is allowed to be written by the guest.

For another example, a field #2 is used to carry a bit (denoted as a bit #2) that indicates the execution access permission, and the bit #2 is used to indicate whether the memory space (specifically, code or instructions stored in the memory space) corresponding to the HPA (or a GPA) is allowed to be executed by the guest. The bit #2 includes one or more bits. This is not specifically limited in this application, provided that the foregoing processing unit 112 and the foregoing memory control unit 114 can agree on explanations of different values of the bit #2. For example, when the bit #2 is "0", it indicates that the memory space is not allowed to be executed by the guest. For another example, when the bit #2 is "1", it indicates that the memory space is allowed to be executed by the guest.

A corresponding access permission flag is set in the EPT page table, to control access of the guest to a specific physical page. When the guest violates control over a corresponding permission flag bit during execution, for example, reads content of a physical page whose permission is set to non-read, a page exception (EPT violation) is triggered.

In this embodiment of this application, the switching triggering module obtains, based on the nested page table and the page exception in the virtual execution environment described above, information about the internal code that is being executed or to be executed.

Specifically, in an example, all physical memories of the virtual machine are classified into three types from a perspective of logical usage, and corresponding access permissions are separately set in the nested page table.

1. Permissions in the nested page table of the physical memory are set to read, write, and non-execute (read, write, and non-execute).

It may be understood that, because the virtual machine can read data stored in the physical memory but cannot execute the data, and the physical memory is used to store the data when being used, the virtual machine can read and write the physical memory, but cannot execute the physical memory.

2. Permissions in the nested page table of the physical memory are set to read, non-write, and non-execute (read, non-write, and non-execute).

It may be understood that the virtual machine can read internal code stored in the physical memory, but cannot rewrite the stored internal code. In addition, the internal code belongs to code of a monitored target program, and the internal code cannot be executed in the virtual execution environment. Therefore, for the physical memory that stores the internal code, the corresponding permissions of the physical memory are set to read, non-write, and non-execute. The virtual machine can read the physical memory, but cannot write the physical memory, and cannot execute the physical memory.

3. Permissions in the nested page table of the physical memory are set to read, non-write, and execute (read, non-write, and execute).

It may be understood that the virtual machine can read external code (for example, system kernel code or library code) stored in the physical memory, but cannot rewrite the stored external code. In addition, the external code does not belong to code of a monitored target program, and can be executed in the virtual execution environment. Therefore, for the physical memory that stores the external code, the corresponding permissions of the physical memory are set to read, non-write, and execute. The virtual machine can read the physical memory and execute the physical memory, but cannot write the physical memory.

When the virtual machine accesses the physical memory, if the access request conflicts with the permission in the nested page table of the physical memory page, a page exception is generated and enters the hypervisor. The switching triggering module performs corresponding determining and processing based on information about the page exception. In this way, timing at which the internal code is to be executed is exactly caught. The following gives detail description with reference to specific embodiments, and details are not described herein.

(2) Switching Module

The switching module is located in the simulation execution engine in the simulated execution environment, and is responsible for receiving a heterogeneous environment switching notification sent by the switching triggering module and the monitoring module, and performing dynamic switching to the heterogeneous environment, for example, switching from the virtual execution environment to the simulated execution environment and switching from the simulated execution environment back to the virtual execution environment. Optionally, switching needs to ensure that a service running in the virtual machine is transparent and continuous, in other words, the virtual machine does not sense a change of an underlying execution environment, and execution of the virtual machine is not interrupted.

(3) Monitoring Module

The monitoring module is located in the simulation execution engine in the simulated execution environment, and is responsible for monitoring and recording execution behavior of the target program, including an instruction sequence of execution, data information carried in the instruction sequence, semantic information, and the like. For details, refer to the foregoing description. Details are not described herein again. The monitoring module also needs to determine end timing of simulation execution. To be specific, when execution of the internal code ends, and jumps to an external library function or kernel code for execution, the monitoring module instructs the switching module to perform the heterogeneous environment switching, and switch to the virtual execution environment for execution.

Figure 9:
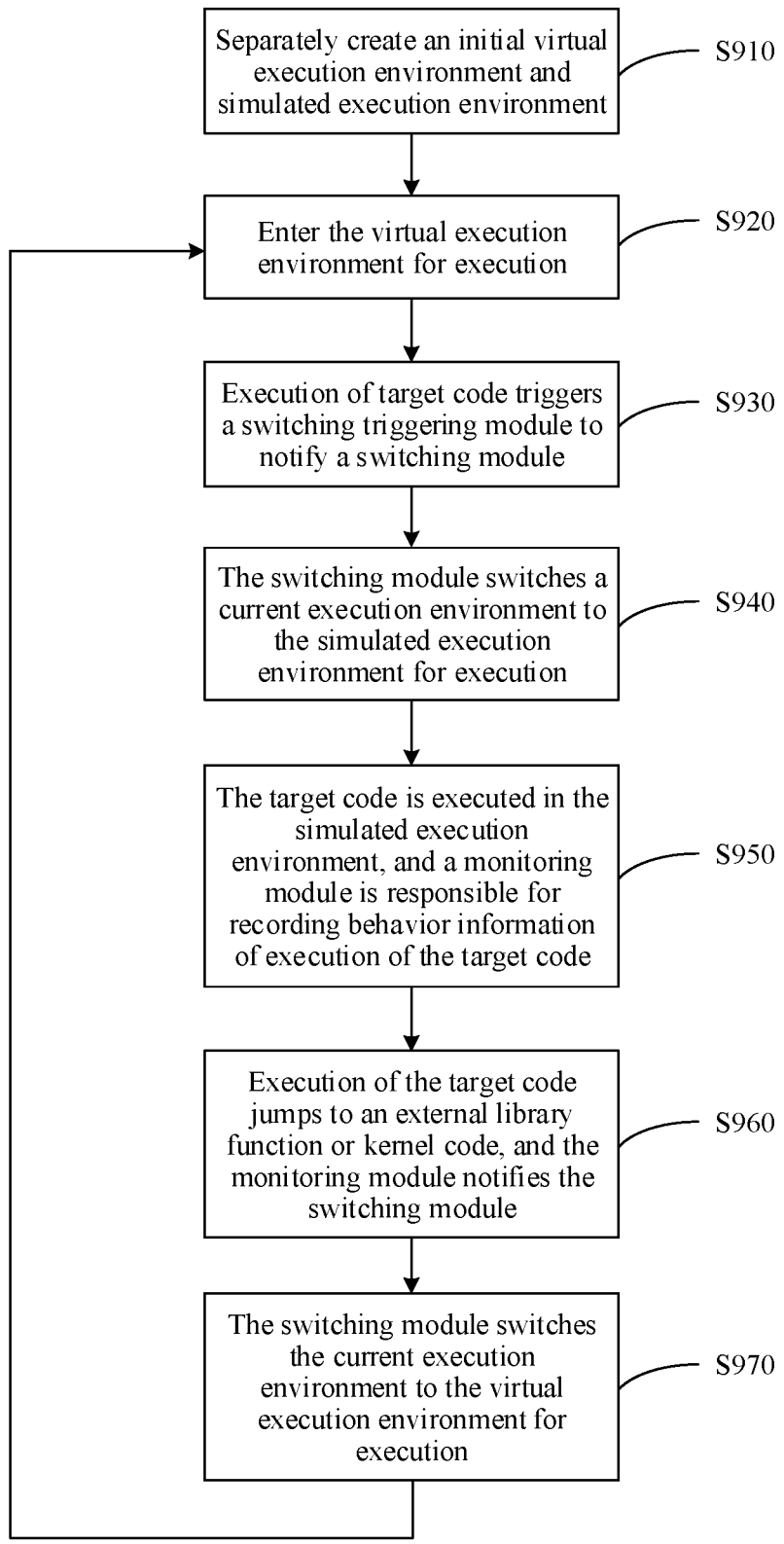
FIG. 9 is a schematic flowchart of a program code execution behavior monitoring method according to an embodiment of this application.

With reference to FIG. 9, the following describes in detail a program code execution behavior monitoring method provided in an embodiment of this application. Refer to FIG. 9. The method includes steps 910 to 970. The following separately describes steps 910 to 970 in detail.

Step 910: Separately create an initial virtual execution environment and simulated execution environment.

In a process of initializing a virtual execution environment, permissions corresponding to all physical memory pages of a virtual machine are set to (read, write, and non-execute) in a nested page table. That is, the physical memory pages of the virtual machine are non-execute initially.

Step 920: Enter the virtual execution environment.

The virtual execution environment is executed first. During execution, the virtual machine accesses the physical memory pages and generates, for a plurality of times, page exceptions that are to enter a hypervisor. Page exceptions include a write conflict, a read conflict, and an execution conflict. The read conflict means that the virtual machine is reading a physical memory page, and a permission, of the physical memory page, set in the nested page table is that the virtual machine is not allowed to read the physical memory page. The write conflict means that the virtual machine is writing a physical memory page, and a permission, of the physical memory page, set in the nested page table is that the virtual machine is not allowed to write the physical memory page. The execution conflict means that the virtual machine is executing a physical memory page, and a permission, of the physical memory page, set in the nested page table is that the virtual machine is not allowed to execute the physical memory page.

Step 930: A switching triggering module notifies a switching module based on that internal code is to be executed.

The switching triggering module determines, based on the page exception generated in an execution process of the virtual machine, that the internal code is to be executed, and when the internal code is to be executed, the switching triggering module instructs the switching module to perform dynamic switching to a heterogeneous environment, so that current virtual execution environment is switched to the simulated execution environment, and the internal code is executed in the simulated execution environment.

In this embodiment of this application, the page exception mainly includes the following three cases.

1. A first physical memory page storing data is executed.

If permissions of the first physical memory page that are set in the nested page table are (read, write, and non-execute), the virtual machine sends an execution request to the first physical memory page in an execution process, and consequently the execution conflict is generated. In this case, it can be understood that program code is loaded to the first physical memory page in a system, and the program code stored in the first physical memory page is to be executed. If the switching triggering module determines that the program code loaded to the first physical memory page is the internal code, the switching triggering module instructs the switching module to perform dynamic switching to the heterogeneous environment. The internal code is executed in the simulated execution environment. The switching triggering module modifies the permissions of the first physical memory in the nested page table to (read, non-write, and non-execute). If the switching triggering module determines that the program code loaded to the first physical memory page is external code, because the external code can be executed in the virtual execution environment, the switching triggering module modifies the permissions of the first physical memory in the nested page table to read, non-write, and execute.

2. A second physical memory page storing the internal code or external code is written.

If permissions of the second physical memory page that are set in the nested page table are (read, non-write, and non-execute) or (read, non-write, and execute), in an execution process, the virtual machine sends a write request to the second physical memory page, and consequently the write conflict is generated. This case is understood as modifying program code in a system. Optionally, the program code is the internal code, or the external code. For example, after execution of the process ends, the program code is cleared and reclaimed, and the permissions corresponding to the second physical memory page storing the program code are restored to an initialized state. In this case, the permissions of the second physical memory page in the nested page table can be modified to (read, write, and non-execute), and the second physical memory page is used to store data.

3. A third physical memory page storing the internal code is executed.

If the permissions of the third physical memory page that are set in the nested page table are (read, non-write, and non-execute), it is understood that the third physical memory page stores the internal code. In an execution process, the virtual machine sends an execution request to the third physical memory page, and consequently the execution conflict is generated. This case is understood as that the third physical memory page stores the internal code, and the virtual machine needs to execute the internal code. In this case, the internal code is to be executed, and the switching triggering module instructs the switching module to perform dynamic switching to the heterogeneous environment, and the internal code is executed in the simulated execution environment.

Figure 12A:
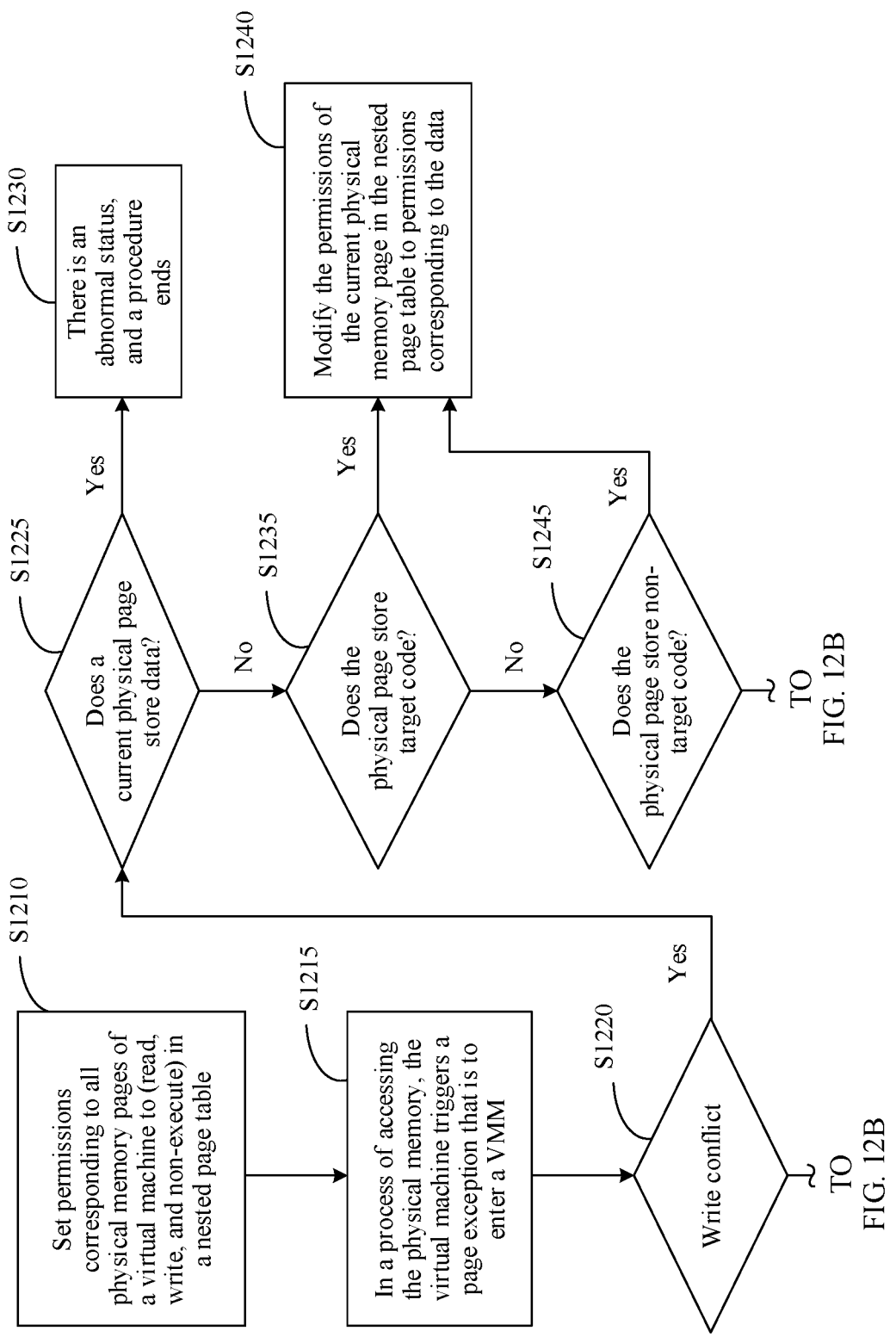
FIG. 12A, FIG. 12B, and FIG. 12C are a schematic flowchart of a method for determining internal code to be executed according to an embodiment of this application.
Figure 12B:
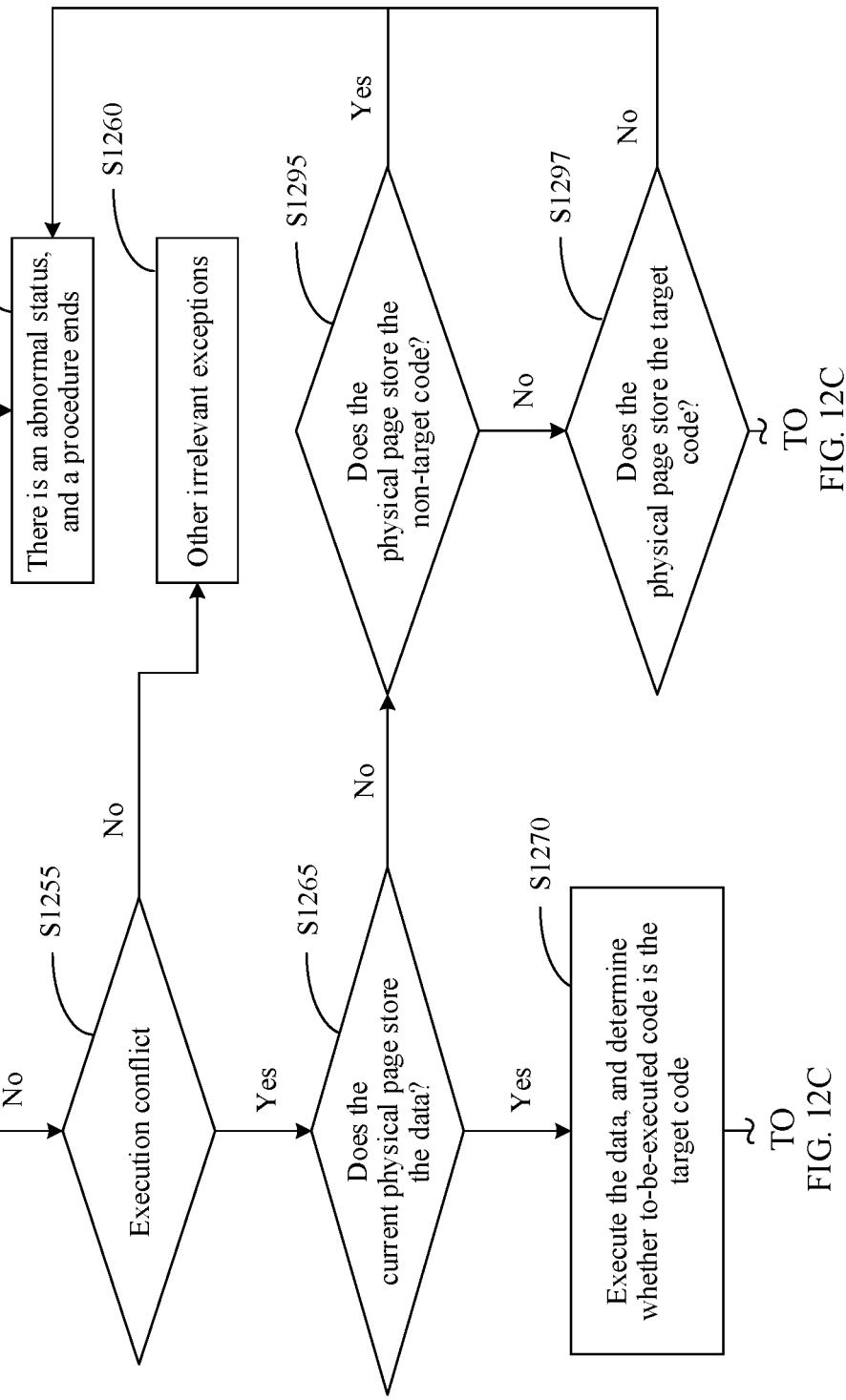
Figure 12C:
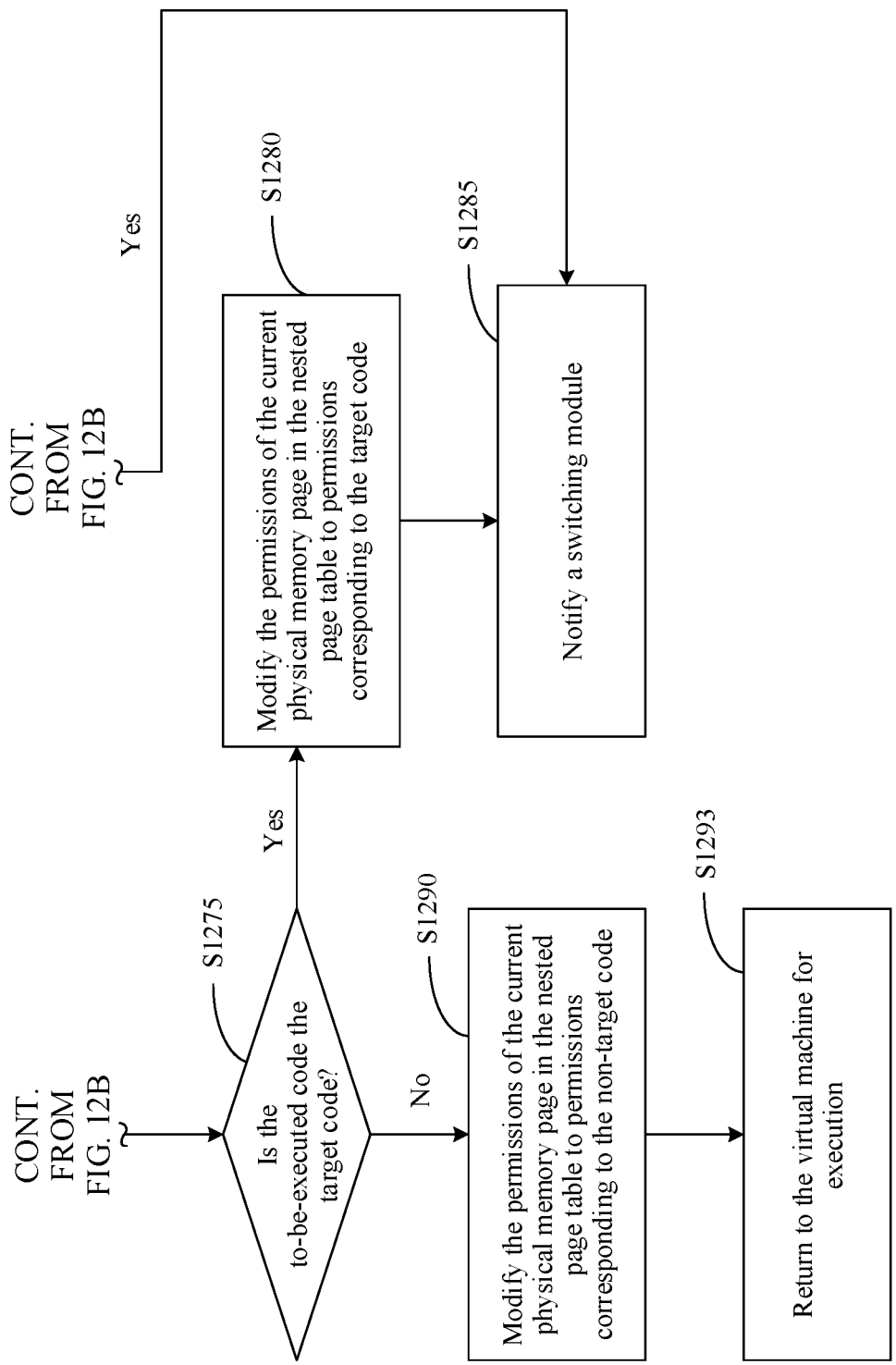

With reference to FIG. 12A, FIG. 12B, and FIG. 12C, the following describes in detail a specific implementation process in which the switching triggering module determines, based on a type of a current page exception and a permission setting status of a current physical page in the nested page table, that the internal code is to be executed. Details are not described herein.

Step 940: The switching module switches a current execution environment to the simulated execution environment.

The switching triggering module sends a notification to the switching module when determining that the internal code is to be executed. The switching module switches an execution environment based on the notification sent by the switching triggering module, and switches the current execution environment to the simulated execution environment. The internal code is executed in the simulated execution environment.

Optionally, when switching the current execution environment, the switching module needs to ensure continuity of a service running in the virtual machine, in other words, the virtual machine does not sense a change of an underlying execution environment, and execution of the virtual machine is not interrupted. Switching that needs to be performed by the switching module includes but is not limited to: switching a context of a processor, or switching a memory access. Optionally, the switching module further switches input/output (I/O) processing.

Figure 10:
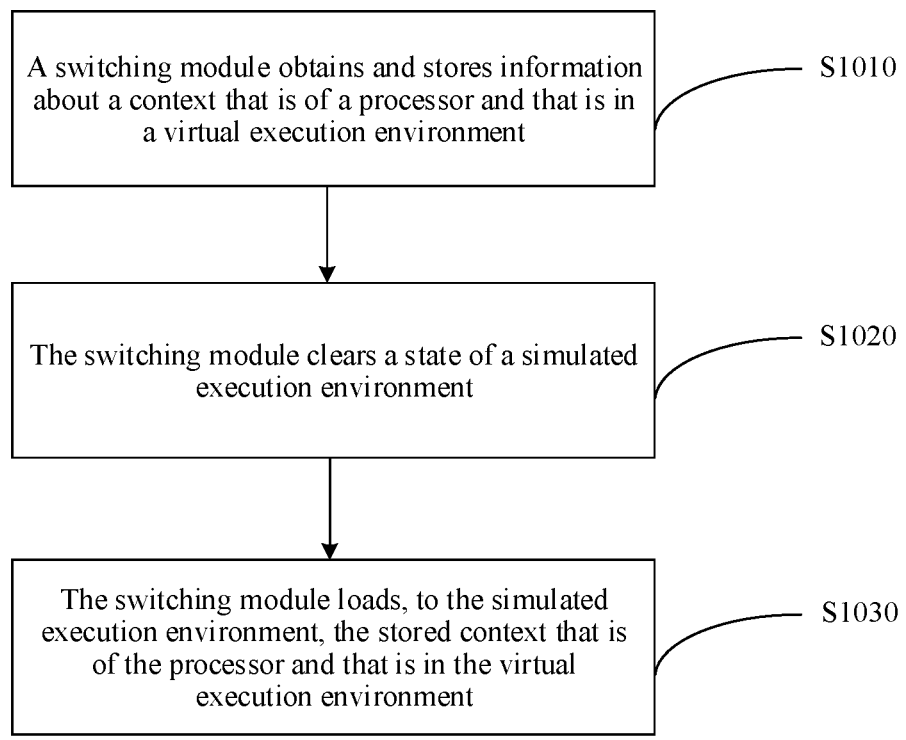
FIG. 10 is a schematic flowchart of a method for switching a context of a processor according to an embodiment of this application.

With reference to FIG. 10, the following describes in detail a process in which the switching module switches the context of the processor in step 940, to switch the current execution environment to the simulated execution environment.

As shown in FIG. 10, the method includes steps 1010 to 1030. The following separately describes steps 1010 to 1030 in detail.

Step 1010: The switching module obtains and stores information about the context that is of the processor and that is in the virtual execution environment.

The information about the context that is of the processor and that is in the virtual execution environment includes but is not limited to information stored in a general-purpose register, a system status register, a system control register, or another processor architecture-related register. The general-purpose register is used to store generally calculated register data (for example, x86 rax and rbx). The system status register is used to store register data (for example, x86 rflags) of a system status during calculation. The system control register is used to store register data (for example, x86 cr3, cr4, msr, and a debug register) of control system configuration information.

Step 1020: The switching module clears a state of the simulated execution environment.

In this embodiment of this application, the switching module can clear a code buffer block of the simulated execution environment, content of a translation lookaside buffer (TLB), and the like.

Step 1030: The switching module loads, to the simulated execution environment, the stored context that is of the processor and that is in the virtual execution environment.

The switching module can load, to the created simulated execution environment, the information, stored in step 1010, about the context that is of the processor and that is in the virtual execution environment.

Figure 11:
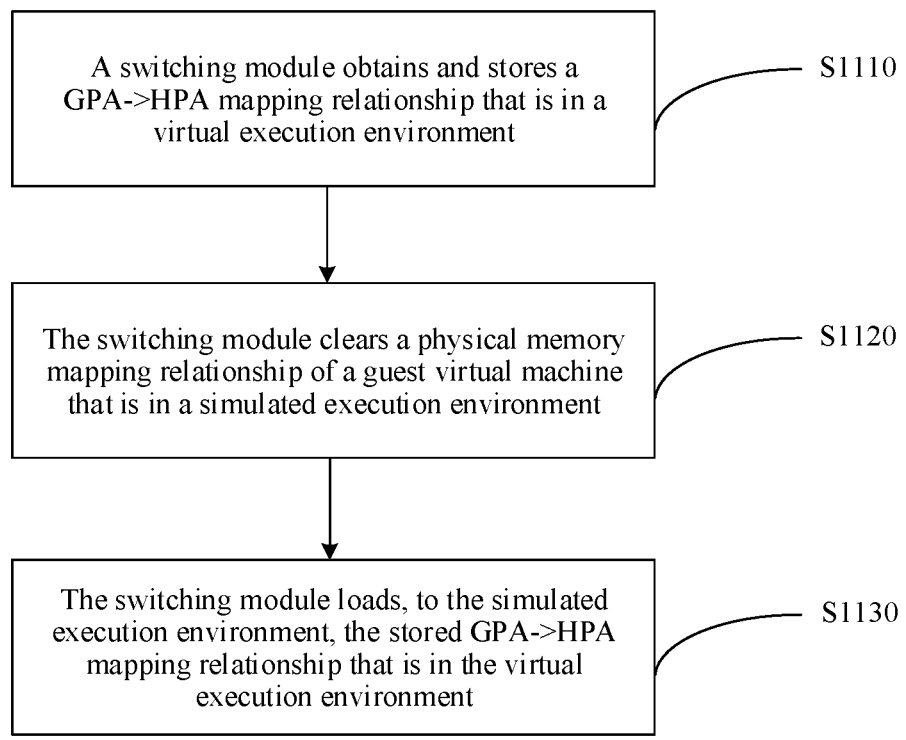
FIG. 11 is a schematic flowchart of a memory access switching method according to an embodiment of this application.

With reference to FIG. 11, the following describes in detail a process in which the switching module switches the memory access in step 940, to switch the current execution environment to the simulated execution environment.

As shown in FIG. 11, the method includes steps 1110 to 1130. The following separately describes steps 1110 to 1130 in detail.

It should be understood that memory access in the virtual execution environment is performed by using two-layer page table mapping, and memory access in the simulated execution environment is performed by using an MMU simulated by software. It needs to be ensured that memory access is consistent when the virtual machine switches from the virtual execution environment to the simulated execution environment, and therefore, no error occurs. To ensure that memory access operations in the two execution environments are consistent, it needs to be ensured that an access operation of the virtual machine to a GPA during execution of the two execution environments can be correctly mapped to a corresponding HPA. Therefore, during memory access switching, first, a GPA→HPA mapping relationship in the virtual execution environment needs to be obtained and stored, and then the corresponding GPA→HPA mapping relationship needs to be loaded to the simulated execution environment, to implement the consistent memory access.

Step 1110: The switching module obtains and stores the GPA→HPA mapping relationship that is in the virtual execution environment.

Step 1120: The switching module clears a physical memory mapping relationship of a guest virtual machine that is in the simulated execution environment.

Step 1130: The switching module loads, to the simulated execution environment, the stored GPA→HPA mapping relationship that is in the virtual execution environment.

The switching module can load, to the created simulated execution environment, the GPA→HPA mapping relationship that is in the virtual execution environment and that is stored in step 1110.

Optionally, to implement that when switching to the simulated execution environment is performed, an I/O operation of a peripheral device is consistent with an operation in the virtual execution environment, and no error occurs, I/O processing of the peripheral device further needs to be switched.

Current mainstream virtualization platforms (for example, a kernel-based virtual machine (KVM) and Xen) reuse a functional component of the simulated execution environment to implement an I/O virtualization function (for example, the KVM and Xen implement the I/O virtualization function based on a QEMU simulator). Therefore, the virtual execution environment and the simulated execution environment use the same component in I/O processing, and no additional switching is required.

Optionally, for performance-sensitive devices of a small quantity, for example, a clock device, the virtualization platform uses a separate component to implement and process the performance-sensitive device in the hypervisor (for performance consideration). With reference to the foregoing processor and memory switching method, switching is performed in a manner of first storing a device state, and then loading the device state to the simulated execution environment.

Continuing to refer to FIG. 9, step 950: The internal code is executed in the simulated execution environment, and a monitoring module is responsible for recording behavior information of execution of the internal code.

The internal code is executed in the simulated execution environment. The monitoring program is deployed in the monitoring module, and is adapted to monitor the executed internal code at an instruction level, including all instruction sequences during execution of the internal code, data information carried in the instruction sequences, and semantic information.

Step 960: Execution of the internal code jumps to an external function library or kernel code, and the monitoring module instructs the switching module to perform dynamic switching to the heterogeneous environment.

When the internal program code is executed in the simulated execution environment, the monitoring module is responsible for monitoring and recording the behavior information of execution of the internal code. When execution of the internal code ends and a control flow jumps to execution of the external code, the monitoring module can record a function call name, parameter data, a return value, and the like. In addition, the monitoring module further instructs the switching module to perform dynamic switching to the heterogeneous environment, and switches the execution environment from the simulated execution environment to the virtual execution environment.

The following describes in detail a method in which the monitoring module monitors the executed internal code in the simulated execution environment.

The monitoring module is located in a simulator, for example, acts as a module in the QEMU. When the execution environment of the internal code is switched to the simulated execution environment for execution, the monitoring module in the simulator is responsible for monitoring the execution of the internal code and recording and analyzing behavior of the internal code. Specifically, the simulator reads a value of a current RIP register (stores a current instruction address), and determines, based on the instruction address, whether program code to be executed belongs to the internal code.

If the simulator determines that the program code to be executed belongs to the internal code, a simulator execution engine obtains content of current instructions from a memory and translates the content, and the monitoring module adds, based on a type of the current instructions, corresponding monitoring code in a process of instruction translation. For example, if the current instructions are function call instructions, for example, call instructions, it indicates that a function call is to be performed on current target internal code. Behavior information of the function call needs to be recorded, such as a target function address and a call parameter. The monitoring module adds corresponding monitoring code to record the function call information. The simulator execution engine translates instructions one by one until a jump instruction appears. When the jump instruction such as a jmp instruction and a ret instruction appears, the simulator execution engine stops translation, executes a translated internal code block, and performs actual behavior monitoring and recording. After execution of the code block is complete, the simulator execution engine continues to perform subsequent operations.

If the simulator determines that the program code to be executed is not the internal code, the monitoring module instructs the switching module to perform dynamic switching to the heterogeneous environment, and switches the execution environment from the simulated execution environment to the virtual execution environment.

It should be noted that different sandbox implementation platforms have different locations of the simulator. This is not specifically limited in this application.

In this embodiment of this application, there are a plurality of methods in which the switching triggering module determines whether the loaded program code to be executed is the internal code or the external code. In a possible implementation, the switching triggering module determines, based on a "recovery of semantics" method, that the program code that is to be executed and that is loaded in a current physical memory page is the internal code or the external code.

It should be understood that the switching triggering module recovers, in the VMM, semantic information in the VM based on the recovery of semantics method, and performs determining based on the related semantic information.

For example, in this application, the switching triggering module determines, based on one or more of the following semantic information, whether the loaded program code is the internal code: information about a currently executed process or information about a currently executed module.

Specifically, the switching triggering module determines, based on the information about the currently executed process, such as a process name and an executable file path corresponding to the process, whether the program code to be executed belongs to the internal code.

In addition, the program code to be executed includes the internal code, and may further include the external code (for example, system library code dynamically mapped from an operating system). Therefore, the switching triggering module determines, based on information about a module to which currently executed code belongs, for example, a current module name, whether the code belongs to a code module of the program code. If the module to which the currently executed code belongs is the code module of the program code, the switching triggering module determines that the program code to be executed belongs to the internal code.

It should be noted that different platforms (for example, Intel/ARM and Windows/Linux) use different methods for obtaining semantic information of a process. In a possible implementation, for example, in an Intel x86 server, a Windows system currently runs within a VMM, and the VMM obtains a value in a current CR3 register. This register stores a base address of a page table of a process being currently executed. In the Windows operating system, unique page tables are allocated to all processes. Therefore, the process can be uniquely identified by using the base address of the page table. In addition, Windows records and maintains, in a process linked list, CR3 values allocated to all processes. Then, the VMM starts to traverse the process linked list in a system kernel of Windows one by one. Each entry in the linked list is in an EPROCESS data structure. The data structure is used by Windows to record information about each process, such as a process name, a process ID, and a process image base address, and also includes a base address of a page table of the process. Therefore, the linked list is traversed, and the value of the current CR3 register is matched with a value of the base address of the page table of the process recorded in the EPROCESS, to determine an EPROCESS data structure corresponding to the currently running process, and further obtain all semantic information of the currently running process.

Step 970: The switching module switches the current execution environment to the virtual execution environment, and execution continues.

The switching module switches the execution environment from the simulated execution environment to the virtual execution environment based on the notification triggered by the monitoring module, and continues to perform step 920.

With reference to FIG. 12A, FIG. 12B, and FIG. 12C, the following describes a specific implementation in which the switching triggering module determines that the to-be-executed code (namely, second code) belongs to the internal code in step 930. Refer to FIG. 12A, FIG. 12B, and FIG. 12C. The method includes steps 1210 to 1297. The following separately describes steps 1210 to 1297 in detail.

Step 1210: Set the permissions corresponding to all the physical memory pages of the virtual machine to (read, write, and non-execute) in the nested page table.

Step 1215: In a process of accessing the physical memory, the virtual machine triggers a page exception that is to enter the VMM.

The page exception triggered in this embodiment of this application includes but is not limited to the write conflict, the read conflict, or the execution conflict. For specific description of the write conflict, the read conflict, and the execution conflict, refer to the foregoing description. Details are not described herein again.

Step 1220: The switching triggering module determines whether the current page exception is the write conflict.

If the switching triggering module determines that the current page exception is the write conflict, steps 1225 to 1250 may be performed.

If the switching triggering module determines that the current page exception is not the write conflict, step 1255 is performed.

Step 1225: The switching triggering module determines whether the current physical memory page that triggers the write conflict stores data.

Specifically, the switching triggering module determines, based on permissions that are set in the nested page table and that are of the current physical memory page that triggers the write conflict, whether the current physical memory page stores the data.

If the permissions that are of the current physical memory page that triggers the write conflict and that are set in the nested page table are (read, write, and non-execute), the physical memory page stores the data. Then go to step 1230.

If the permissions that are of the current physical memory page that triggers the page exception and that are set in the nested page table are not (read, write, and non-execute), the physical memory page does not store the data. Then go to step 1235.

Step 1230: There is an abnormal status, and a procedure ends.

If the switching triggering module determines that the current physical memory page that triggers the write conflict stores the data, the physical memory page is written by the virtual machine. The physical memory page triggers the write conflict, indicating that there is the abnormal status, and the procedure ends.

Step 1235: The switching triggering module determines whether the current physical memory page that triggers the write conflict stores the internal code.

Specifically, the switching triggering module determines, based on permissions that are set in the nested page table and that are of the current physical memory page that triggers the write conflict, whether the current physical memory page stores the internal code.

If the permissions that are of the current physical memory page that triggers the write conflict and that are set in the nested page table are (read, non-write, and non-execute), the physical memory page stores the internal code. Then go to step 1240.

If the permissions that are of the current physical memory page that triggers the write conflict and that are set in the nested page table are not (read, non-write, and non-execute), the physical memory page does not store the internal code. Then go to step 1245.

Step 1240: Modify the permissions corresponding to the current physical memory page in the nested page table, so that the current physical memory page is used to store the data.

If the switching triggering module determines that program code loaded to the current physical memory page is the internal or external code, the current physical memory page triggers the write conflict. This case is understood as that the internal or external code in the system is modified. For example, the internal or external code is cleared and reclaimed after execution of the process ends. In this case, the permissions of the current physical memory page in the nested page table are modified to (read, write, and non-execute), and the current physical memory page is used to store the data.

Step 1245: The switching triggering module determines whether the current physical memory page that triggers the write conflict stores the external code.

Specifically, the switching triggering module determines, based on permissions that are set in the nested page table and that are of the current physical memory page that triggers the write conflict, whether the current physical memory page stores the external code.

If the permissions that are of the current physical memory page that triggers the write conflict and that are set in the nested page table are (read, non-write, and execute), the physical memory page stores the external code. Then go to step 1240.

If the permissions that are of the current physical memory page that triggers the write conflict and that are set in the nested page table are not (read, non-write, and execute), the physical memory page does not store the external code. Then go to step 1250.

Step 1250: There is an abnormal status, and a procedure ends.

If the switching triggering module determines, based on the permissions that are of the current physical memory page and that are set in the nested page table, that the current physical memory page that triggers the write conflict stores neither the data nor the internal code nor the external code, it can be understood that there is the abnormal status, and the procedure ends.

Step 1255: The switching triggering module determines whether the current page exception is the execute conflict.

If the switching triggering module determines that the current page exception is not the execute conflict, step 1260 is performed.

If the switching triggering module determines that the current page exception is the execute conflict, step 1265 is performed.

Step 1260: The VMM processes other irrelevant exceptions.

If the switching triggering module determines that the current page exception is not the write conflict or the execution conflict, the exception may be another irrelevant exception, and processed by the VMM.

Step 1265: The switching triggering module determines whether the current physical memory page that triggers the execute conflict stores the data.

A determining method is similar to step 1225. For details, refer to the description in step 1225. Details are not described herein again.

If the current physical memory page that triggers the execution conflict stores the data, steps 1270 to 1293 are performed.

If the current physical memory page that triggers the execution conflict does not store the data, steps 1295 to 1297 are performed.

Step 1270: Execute the current physical memory page, and the switching triggering module determines whether to-be-executed program code loaded to the current physical memory page is the internal code or the external code.

It should be understood that, executing the current physical memory page is understood as loading the program code in the system to the current physical memory page. The program code is the internal code or the external code.

Step 1275: The switching triggering module determines whether the program code to be executed is the internal code.

The switching triggering module determines whether the program code to be executed is the internal code, and if the program code is the internal code, steps 1280 to 1285 are performed. If the program code to be executed is not the internal code, steps 1290 to 1293 are performed. Specifically, for a method in which the switching triggering module determines whether the program code to be executed is the internal code, refer to the foregoing method description. Details are not described herein again.

Step 1280: Modify the permissions of the current physical memory page in the nested page table to the permissions corresponding to the internal code.

If the internal code is loaded to the current physical memory page that triggers the execution conflict, and the internal code is to be executed, the switching triggering module modifies the permissions of the current physical memory page in the nested page table to (read, non-write, and non-execute).

That is, if the switching triggering module determines, based on the page exception, that the internal code is loaded to the current physical memory page, the permissions of the current physical memory page in the nested page table are modified to the permissions corresponding to the internal code. To be specific, the virtual machine can read the internal code stored in the physical memory, but cannot rewrite the stored internal code, and cannot execute the internal code in the virtual execution environment.

Step 1285: The switching triggering module notifies the switching module.

The switching triggering module determines, based on the page exception, that the internal code is loaded to the current physical memory page. In addition to modifying the permissions of the current physical memory page in the nested page table to the permissions corresponding to the internal code, the switching triggering module further needs to instruct the switching module to perform dynamic switching to the heterogeneous environment. In this way, the internal code is executed in the simulated execution environment.

Step 1290: Modify the permissions of the current physical memory page in the nested page table to the permissions corresponding to the external code.

If the external code is loaded to the current physical memory page that triggers the execution conflict, and the external code is to be executed, because the external code can be executed in the virtual execution environment, the switching triggering module modifies the permissions of the current physical memory page in the nested page table to (read, non-write, and execute).

That is, if the switching triggering module determines, based on the page exception, that the external code is loaded to the current physical memory page, the permissions of the current physical memory page in the nested page table are modified to the permissions corresponding to the external code. To be specific, the virtual machine can read the external code stored in the physical memory, cannot rewrite the stored external code, but can execute the external code in the virtual execution environment.

Step 1293: Return to the virtual machine for execution.

Step 1295: Determine whether the current physical memory page stores the external code.

If the current physical memory page that triggers the execution conflict does not store the data, whether the current physical memory page stores the external code is determined. If it is determined that the current physical memory page stores the external code, because the permission of the physical memory page storing the external code in the nested page table is execute, step 1250 is performed.

If it is determined that the current physical memory page does not store the external code, step 1297 is performed.

Step 1297: Determine whether the current physical memory page stores the internal code.

If the current physical memory page that triggers the execution conflict stores the internal code, it indicates that the internal code is to be executed in this case. Therefore, step 1285 is performed to instruct the switching module to switch the execution environment.

If the current physical memory page that triggers the execution conflict stores neither the internal code nor the external code, there may be another status exception, and step 1250 is performed.

The program code execution behavior monitoring method is described in detail above, so that not only a capability of monitoring code execution of a target program by a sandbox system can be implemented, but also overall system performance overheads can be reduced.

Figure 13:
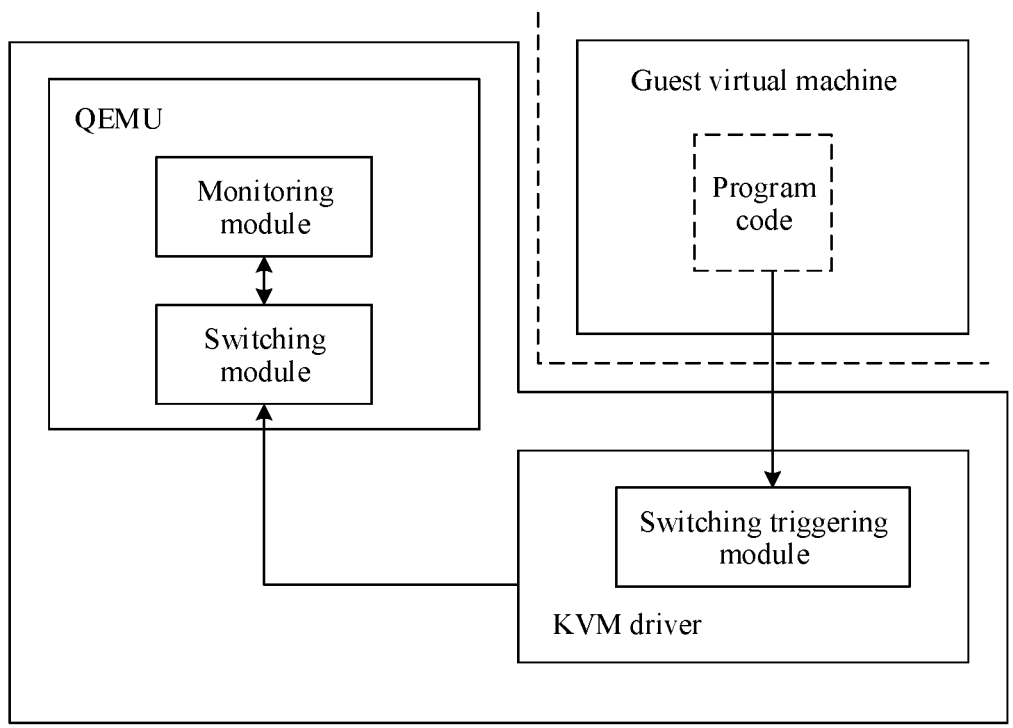
FIG. 13 is an architectural diagram of a possible KVM virtualization platform according to an embodiment of this application.

With reference to FIG. 13, the following describes in detail a specific implementation process of the program code execution behavior monitoring method provided in the embodiments of this application by using an x86 architecture and a KVM virtualization platform as an example.

It should be noted that the example in FIG. 13 is merely intended to help a person skilled in the art understand the embodiments of this application, instead of limiting the embodiments of this application to a specific value or a specific scenario shown in the example. A person skilled in the art can definitely make various equivalent modifications or changes based on the examples described above, and such modifications and changes also fall within the scope of the embodiments of this application.

FIG. 13 is an architectural diagram of a possible KVM virtualization platform according to an embodiment of this application.

Refer to FIG. 13. The KVM virtualization platform includes two parts: a user mode QEMU process and a kernel mode KVM driver. The QEMU process is used to create the simulated execution environment described above, and is mainly responsible for functions such as device simulation, memory management, and startup and shutdown of a guest virtual machine. The KVM driver is adapted to create the virtual execution environment described above, and is mainly responsible for executing a virtual central processing unit (VCPU) of the guest virtual machine, handling an exception and an interrupt trap of the guest virtual machine, and so on.

A switching triggering module is located in the KVM driver, and a monitoring module and a switching module are located in the QEMU process.

The QEMU process includes a simulation execution engine, for example, a tiny code generation (TCG) engine that is responsible for completely simulating and executing a function of the VCPU. It should be noted that, in a KVM virtualization scenario, the simulation execution engine is not enabled, and the VCPU is executed by a KVM driver module.

In this embodiment of this application, the TCG simulation execution engine is enabled on the KVM platform, and the monitoring module and the switching module are located in the TCG simulation execution engine. The switching module is responsible for engine switching between the TCG engine and the KVM driver, so that the guest virtual machine performs on-demand switching between the simulated execution environment and the virtual execution environment. The monitoring module monitors behavior of the internal code running in the simulated execution environment.

(1) Initialization

The user-mode QEMU process is responsible for creating the simulated execution environment of the guest virtual machine and initializes a system status, such as an initial value of a CPU register, a physical address space of the guest virtual machine, and an initial I/O status of a device. The KVM driver is responsible for creating the virtual execution environment of the guest virtual machine.

It should be understood that, in an initialization phase, the TCG execution engine in the QEMU process is started and initialized, and the engine is in an initialized but not executed state, in other words, runs in a KVM virtual execution environment when initialization is implemented.

In the initialization phase in this embodiment of this application, the QEMU process instructs, by using an IOCTL interface, the KVM driver module to set all physical memories of the guest virtual machine to a non-execute permission. In other words, the KVM driver module is instructed to set permissions of all the physical memories of the guest virtual machine in the nested page table to (read, write, and non-execute).

After the initialization is complete, a guest virtual machine that enters a non-root mode is used for execution. When the guest virtual machine is used for execution in the virtual execution environment, page exceptions that trap to a hypervisor are generated for a plurality of times due to EPT permission conflicts. The switching triggering module in the KVM driver can determine, based on the page exception and the method described in FIG. 10, whether an execution environment needs to be switched. For a specific determining method, refer to the description in FIG. 10. Details are not described herein again.

When the execution environment needs to be switched, the switching triggering module in the KVM driver returns to the QEMU process in a user space through an I/O channel of a KVM, and instructs the switching module in the QEMU process to be responsible for specific switching work.

(2) Execution Environment Switching

The switching module in the QEMU process switches the current execution environment to the simulated execution environment based on the notification sent by the switching triggering module.

Specifically, the switching module in the QEMU process first obtains context information of a processor (for example, a CPU) in the KVM driver by using an IOCTL command. For example, by calling a kvm_arch_get_registers function, a VCPU data structure simulated by a QEMU is transferred as a parameter to the context information. The function is responsible for obtaining and writing the data structure to a CPU context of the QEMU, and calls a cpu_exec function to enable the TCG simulation execution engine to be responsible for specific execution. After the execution is completed, the function returns, and a kvm_arch_put_registers function is called to load a context, updated after QEMU execution, of the processor (for example, CPU) back to the KVM driver.

(3) The monitoring module is responsible for monitoring the behavior of the internal code.

Figure 14:
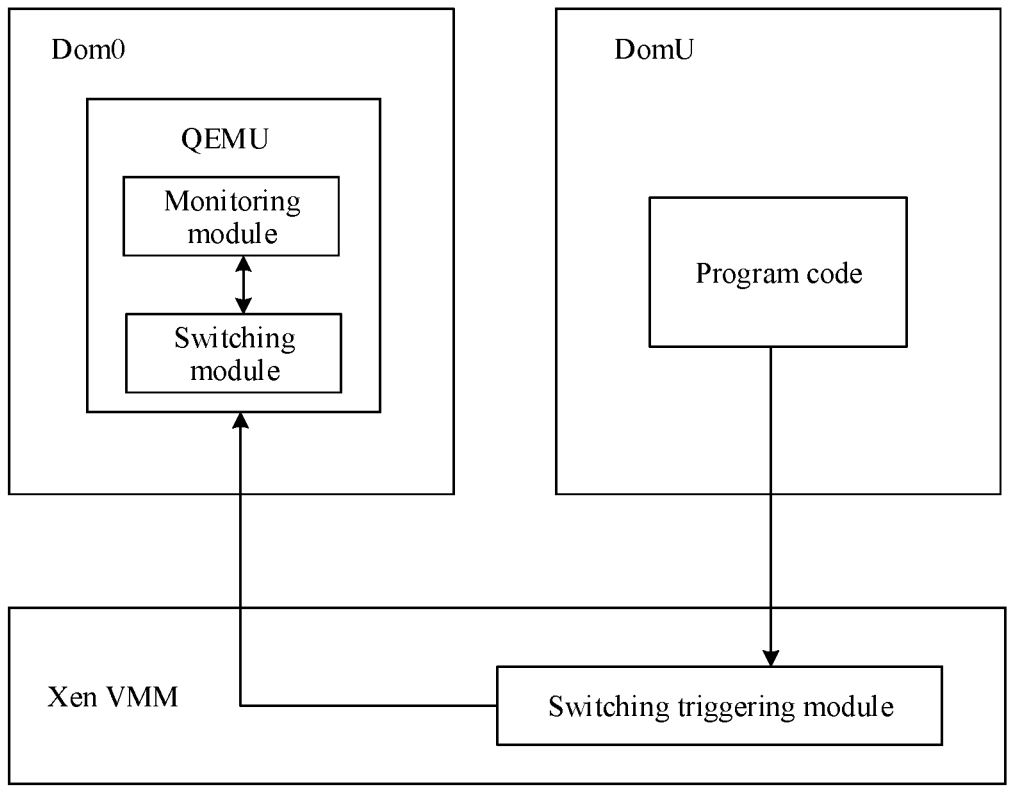
FIG. 14 is an architectural diagram of a possible Xen virtualization platform according to an embodiment of this application.

With reference to FIG. 14, the following describes in detail a specific implementation process of the program code execution behavior monitoring method provided in the embodiments of this application by using a Xen virtualization platform as an example.

It should be noted that the example in FIG. 14 is merely intended to help a person skilled in the art understand the embodiments of this application, instead of limiting the embodiments of this application to a specific value or a specific scenario shown in the example. A person skilled in the art can definitely make various equivalent modifications or changes based on the examples described above, and such modifications and changes also fall within the scope of the embodiments of this application.

FIG. 14 is an architectural diagram of a possible Xen virtualization platform according to an embodiment of this application.

Refer to FIG. 14. The Xen virtualization platform includes a virtual machine monitor Xen VMM, a privileged domain virtual machine Dom0, and a user domain virtual machine DomU. In a Xen virtualization environment deployed on a physical server, there is only one Dom0 that is responsible for privileged operations in an entire system. Optionally, there are a plurality of DomUs that are responsible for providing a virtual execution environment for a user system resource.

A QEMU process created in the privileged domain virtual machine Dom0 is used to create the simulated execution environment described above, and is mainly responsible for functions such as device simulation, memory management, and startup and shutdown of a guest virtual machine. The Xen VMM is adapted to create the virtual execution environment described above, and is mainly responsible for executing a virtual central processing unit (VCPU) of the guest virtual machine, handling an exception and an interrupt trap of the guest virtual machine, and so on.

A switching triggering module is located in the Xen VMM, and a monitoring module and a switching module are located in the QEMU process created by the Dom0.

The QEMU process includes a simulation execution engine, for example, a tiny code generation (TCG) engine that is responsible for completely simulating and executing a function of the VCPU. It should be noted that, in the Xen virtualization scenario, a QEMU is mainly responsible for device simulation. Therefore, the simulation execution engine is not enabled, and the Xen VMM is responsible for VCPU execution.

In this embodiment of this application, the TCG simulation execution engine is enabled on the Xen platform, and the monitoring module and the switching module are located in the TCG simulation execution engine. The switching module is responsible for engine switching between the TCG engine and the Xen VMM, so that the guest virtual machine performs on-demand switching between the simulated execution environment and the virtual execution environment. The monitoring module monitors behavior of internal code running in the simulated execution environment.

(1) Initialization

A user-mode QEMU process is responsible for creating the simulated execution environment of the guest virtual machine and initializes a system status, such as an initial value of a CPU register, a physical address space of the guest virtual machine, and an initial I/O status of a device. The Xen VMM is responsible for creating the virtual execution environment of the guest virtual machine.

It should be understood that, in an initialization phase, the TCG execution engine in the QEMU is started and initialized, and the engine is in an initialized but not executed state, in other words, runs in a Xen virtual execution environment when initialization is implemented.

In this embodiment of this application, in the initialization phase, the QEMU process instructs, by using a hypercall interface in the Dom0 (where this interface is a call interface for communication between the Dom0 and the Xen VMM on the Xen platform, and the DomU has no permission to invoke this interface), a module in the Xen VMM to set permissions of all physical memories of the guest virtual machine to non-execute. In other words, the module in the Xen VMM is instructed to set the permissions of all the physical memories of the guest virtual machine in a nested page table to (read, write, and non-execute).

After the initialization is complete, a guest virtual machine that enters a non-root mode is used for execution. When the guest virtual machine is used for execution in the virtual execution environment, page exceptions that trap to the Xen VMM are repeatedly generated due to EPT permission conflicts. The switching triggering module in the Xen VMM can determine, based on the page exception and the method described in FIG. 10, whether an execution environment needs to be switched. For a specific determining method, refer to the description in FIG. 10. Details are not described herein again.

When the execution environment needs to be switched, the switching triggering module in the Xen VMM returns to the QEMU process in a user space through an I/O channel of the Xen VMM, and instructs the switching module in the QEMU process to be responsible for specific switching work.

(2) Execution Environment Switching

The switching module in the QEMU process switches the current execution environment to the simulated execution environment based on the notification sent by the switching triggering module.

Specifically, the switching module in the QEMU process first obtains context information of a processor (for example, a CPU) in the Xen VMM by using a hypercall, and transfers a VCPU data structure simulated by a QEMU as a parameter to the context information. In this way, the context information in the virtual execution environment (Xen VMM) is loaded to the simulated execution environment (QEMU), and then a cpu_exec function is called to enable the TCG simulation execution engine for specific execution. After the execution ends, the function returns, and then the hypercall interface is invoked to load a context, updated after QEMU execution, of the processor (for example, the CPU) back to the Xen VMM, to load the context information updated in the simulated execution environment back to the virtual execution environment.

(3) The Monitoring Module is Responsible for Monitoring the Behavior of the Internal Code.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

Figure 15:
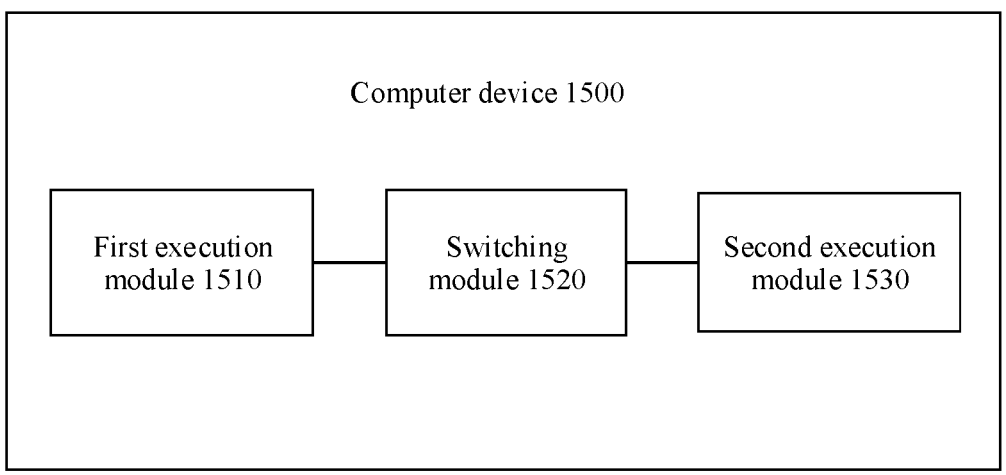
FIG. 15 is a schematic block diagram of another computer device 1500 according to an embodiment of this application.

The following describes in detail an apparatus in an embodiment of this application with reference to FIG. 15. It should be understood that, description of the method embodiments corresponds to description of the apparatus embodiment. Therefore, for a part not described in detail, refer to the foregoing method embodiments.

FIG. 15 is a schematic block diagram of a computer device 1500 according to an embodiment of this application. The computer device 1500 may be implemented as a part or all of the computer device 1500 by using software, hardware, or a combination thereof. The computer device 1500 includes a first execution module 1510, a switching module 1520, and a second execution module 1530.

The first execution module 1510 is adapted to execute, in a virtual execution environment, first code corresponding to first program code, where the first code belongs to external code; and the virtual execution environment is a running environment provided based on a virtualization technology, the external code is code, other than internal code, invoked in the first program code, the external code includes system code provided by an operating system of the computer device, and the internal code is code of a process generated by the first program code.

The switching module 1520 is adapted to: in a process of executing the first code, if second code belongs to the internal code, before execution of the second code is completed, switch an execution environment of the first program code to a simulated execution environment, where the simulated execution environment is a running environment provided based on a simulator, and the second code is to-be-executed code.

It should be understood that, the switching module 1520 corresponds to the foregoing switching module, and is adapted to switch the execution environment of the first program code from the virtual execution environment to the simulated execution environment.

The second execution module 1530 is adapted to execute the second code in the simulated execution environment.

It should be understood that the second execution module 1530 corresponds to the foregoing monitoring module, and is adapted to monitor, in the simulated execution environment, behavior of the second code in an execution process.

In a possible implementation, the computer device 1500 further includes:

a configuration module 1540, adapted to configure an initial system status in the virtual execution environment in an initialization phase, where the initial system status includes any one or more of the following:

an initial value of a processor register, access permissions corresponding to memory spaces are all non-execute, or an initial state of a device input/output I/O, where the configuration module 1540 is further adapted to: in the initialization phase, initialize a simulation execution engine in the simulated execution environment, to enable the simulation execution engine to be in an initialized but not executed state.

In another possible implementation, the second execution module 1530 is further adapted to monitor, in the simulated execution environment, behavior information of the second code in an execution process.

In another possible implementation, the computer device 1500 further includes:

a determining module 1550, adapted to determine, based on a page exception and a nested page table, that the second code belongs to the internal code, where the nested page table records access permissions corresponding to a first memory space, the second code is stored in the first memory space, and the page exception indicates conflict information between an access request for the first memory space and the access permissions corresponding to the first memory space.

It should be understood that the determining module 1550 corresponds to the foregoing switching triggering module.

In another possible implementation, the page exception is a first conflict exception, and the determining module 1550 is specifically adapted to:

catch the first conflict exception, where the first conflict exception is sent when the access request for the first memory space is an execution request, and the access permissions corresponding to the first memory space that are recorded in the nested page table are non-write and non-execute; and determine, based on the first conflict exception, that the second code belongs to the internal code.

In another possible implementation, the page exception is a second conflict exception, and the determining module 1550 is specifically adapted to:

catch the second conflict exception, where the second conflict exception is sent when the access request for the first memory space is an execution request, and the access permissions corresponding to the first memory space that are recorded in the nested page table are write and non-execute; determine, based on the second conflict exception, that the second code belongs to either the internal code or the external code; and determine, based on semantic information of the second code, that the second code belongs to the internal code.

In another possible implementation, the computer device 1500 further includes:

a creation module 1560, adapted to construct the virtual execution environment by using a virtualization platform, where the creation module 1560 is further adapted to construct the simulated execution environment by using simulator software.

In another possible implementation, the simulator software is a quick emulator QEMU.

In another possible implementation, the virtualization platform is a kernel-based virtual machine KVM or Xen.

In another possible implementation, the switching module 1520 is further adapted to: switch any one or more of the following content in the execution environment of the first program code: a context of a processor, memory access, or input/output I/O processing.

In this embodiment, a computer device is further provided. The computer device includes at least one processor and a memory. The memory is adapted to store one or more instructions. The at least one processor is adapted to: execute, in a virtual execution environment, first code corresponding to first program code, where the first code belongs to external code, the virtual execution environment is a running environment provided based on a virtualization technology, the external code is code, other than internal code, invoked in the first program code, the external code includes system code provided by an operating system of the computer device, and the internal code is code of a process generated by the first program code; in a process of executing the first code, if second code belongs to the internal code, before execution of the second code is completed, switch an execution environment of the first program code to a simulated execution environment, where the simulated execution environment is a running environment provided based on a simulator, and the second code is to-be-executed code; and execute the second code in the simulated execution environment.

In this embodiment, a computer-readable storage medium is further provided. The computer-readable storage medium stores instructions. When the instructions in the computer-readable storage medium are executed on a computer device, the computer device performs the foregoing provided method.

In this embodiment, a computer program product including instructions is further provided. When the computer program product runs on a computer device, the computer device is enabled to perform the foregoing provided method.

In this embodiment, a chip is further provided. The chip includes a processor and a data interface, and the processor reads, by using the data interface, instructions stored in a memory, to perform the method in any one of the first aspect or the possible implementations of the first aspect.

In a specific implementation process, the chip may be implemented in a form of a central processing unit (CPU), a micro controller unit (MCU), a micro processing unit (MPU), a digital signal processing (DSP), a system-on-a-chip (SoC), an application-specific integrated circuit (ASIC), a field programmable gate array (FPGA), or a programmable logic device (PLD).

Optionally, in specific implementation, a quantity of processors is not limited. The processor is a general-purpose processor. Optionally, the general-purpose processor may be implemented by hardware or by software. When the processor is implemented by hardware, the processor is a logic circuit, an integrated circuit, or the like. When the processor is implemented by software, the processor is a general-purpose processor, and is implemented by reading software code stored in the memory. The memory is integrated into the processor, or located outside the processor and exists independently.

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of this application are all or partially generated.

Optionally, the computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner.

The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), or a semiconductor medium. The semiconductor medium is a solid-state drive.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" refers to one or more, and "a plurality of" refers to two or more. "At least one item (piece) of the following" or a similar expression thereof means any combination of these items, including any combination of singular items (pieces) or plural items (pieces). For example, at least one (piece) of a, b, or c may represent: a, b, c; a and b; a and c; b and c; or a, b, and c; where a, b, and c may be singular or plural.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art can be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatuses, and methods may be implemented in other manners.

For example, the described apparatus embodiments are merely examples. For example, division into units is merely logical function division and may be other division during actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Optionally, the units described as separate parts are physically separated or not physically separated, and the parts displayed as units are physically separated or not physical units, in other words, are located in one place, or are also distributed on a plurality of network units. Some or all of the units may be selected based on actual requirements to achieve the objectives of the solutions in the embodiments.

In addition, functional units in the embodiments of this application may be integrated into one processing unit. Optionally, each of the units may exist alone physically, or two or more units may be integrated into one unit.

When the functions are implemented in a form of a software functional unit and sold or used as an independent product, the functions can be stored in a computer-readable storage medium. Based on such an understanding, the technical solutions in this application essentially, or the part contributing to a conventional technology, or some of the technical solutions can be implemented in a form of a software product. The computer software product is stored in a storage medium, and includes several instructions for instructing a computer device (which is a personal computer, a server, a network device, or the like) to perform all or some of the steps of the methods in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing description is merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A program code execution behavior monitoring method, comprising:
    executing, by a computer device in a virtual execution environment, first code corresponding to first program code, the virtual execution environment is a running environment provided based on a virtualization technology, the first code is an external code, other than internal code, invoked in the first program code, the external code comprises system code provided by an operating system of the computer device, and the internal code is code of a process generated by the first program code;
    in a process in which the computer device executes the first code, determining if second code belongs to the internal code;
    when the second code belongs to the internal code, before execution of the second code is completed, switching, by the computer device, an execution environment of the first program code to a simulated execution environment, wherein the simulated execution environment is a running environment provided based on a simulator;
    executing, by the computer device, the second code m the simulated execution environment; and
    determining, by the computer device based on a page exception and a nested page table, that the second code belongs to the internal code, wherein the nested page table records access permissions corresponding to a first memory space, the second code is stored in the first memory space, and the page exception indicates conflict information between an access request for the first memory space and the access permissions corresponding to the first memory space.

2. The method according to claim 1, wherein before the executing, by a computer device in a virtual execution environment, first code corresponding to first program code, the method further comprises:
    in an initialization phase, configuring, by the computer device, an initial system status in the virtual execution environment, wherein the initial system status comprises at least one of: an initial value of a processor register, access permissions corresponding to memory spaces are all non-execute, or an initial state of a device input/output (I/O); and
    in the initialization phase, initialing, by the computer device, a simulation execution engine in the simulated execution environment, to enable the simulation execution engine to be in an initialized but not executed state.

3. The method according to claim 1, wherein the executing the second code in the simulated execution environment further comprises:
    monitoring, by the computer device in the simulated execution environment, behavior information of the second code in an execution process.

4. The method according to claim 1, wherein the page exception is a first conflict exception; and
    the determining, by the computer device based on a page exception and a nested page table, that the second code belongs to the internal code comprises:
    catching, by the computer device, the first conflict exception, wherein the first conflict exception is sent when the access request for the first memory space is an execution request, and the access permissions corresponding to the first memory space that are recorded in the nested page table are non-write and non-execute; and
    determining, by the computer device based on the first conflict exception, that the second code belongs to the internal code.

5. The method according to claim 1, wherein the page exception is a second conflict exception; and
    the determining, by the computer device based on a page exception and a nested page table, that the second code belongs to the internal code comprises:
    catching, by the computer device, the second conflict exception, wherein the second conflict exception is sent when the access request for the first memory space is an execution request, and the access permissions corresponding to the first memory space that are recorded in the nested page table are write and non-execute;
    determining, by the computer device based on the second conflict exception, that the second code belongs to either the internal code or the external code; and
    determining, by the computer device based on semantic information of the second code, that the second code belongs to the internal code.

6. The method according to claim 1, wherein the method further comprises:
    constructing, by the computer device, the virtual execution environment by using a virtualization platform; and
    constructing, by the computer device, the simulated execution environment by using simulator software.

7. The method according to claim 6, wherein the simulator software is a quick emulator (QEMU).

8. The method according to claim 6, wherein the virtualization platform is a kernel-based virtual machine (KVM) or Xen.

9. The method according to claim 1, wherein the switching, by the computer device, an execution environment of the first program code to a simulated execution environment further comprises:

switching, by the computer device, any one or more of the following content in the execution environment of the first program code: a context of a processor, memory access, or input/output (I/O) processing.

10. A computer device, comprising:
at least one processor and a non-transitory memory coupled with the one or more processors, wherein the non-transitory memory stores first program code; and
the at least one processor is adapted to: execute, in a virtual execution environment, first code corresponding to the first program code, wherein the first code belongs to external code, the virtual execution environment is a running environment provided based on a virtualization technology, the external code is code, other than internal code, invoked in the first program code, the external code comprises system code provided by an operating system of the computer device, and the internal code is code of a process generated by the first program code; the first code is executed to determine if second code belongs to the internal code; when the second code belongs to the internal code, before execution of the second code is completed, switch an execution environment of the first program code to a simulated execution environment, wherein the simulated execution environment is a running environment provided based on a simulator; and execute the second code in the simulated execution environment, and
determine, based on a page exception and a nested page table, that the second code belongs to the internal code, wherein the nested page table records access permissions corresponding to a first memory space, the second code is stored in the first memory space, and the page exception indicates conflict information between an access request for the first memory space and the access permissions corresponding to the first memory space.

11. The computer device according to claim 10, wherein before the at least one processor executes, in the virtual execution environment, the first code corresponding to the first program code, the at least one processor is further adapted to:
in an initialization phase, configure, an initial system status in the virtual execution environment, wherein the initial system status comprises at least one of: an initial value of a processor register, access permissions corresponding to memory spaces are all non-execute, or an initial state of a device input/output (I/O); and
in the initialization phase, initialize, a simulation execution engine in the simulated execution environment, to enable the simulation execution engine to be in an initialized but not executed state.

12. The computer device according to claim 10, wherein the at least one processor is further adapted to:
monitor, in the simulated execution environment, behavior information of the second code in an execution process.

13. The computer device according to claim 10, wherein the page exception is a first conflict exception, and the at least one processor is specifically adapted to:
catch the first conflict exception, wherein the first conflict exception is sent when the access request for the first memory space is an execution request, and the access permissions corresponding to the first memory space that are recorded in the nested page table are non-write and non-execute; and
determine, based on the first conflict exception, that the second code belongs to the internal code.

14. The computer device according to claim 10, wherein the page exception is a second conflict exception, and the at least one processor is specifically adapted to:
catch the second conflict exception, wherein the second conflict exception is sent when the access request for the first memory space is an execution request, and the access permissions corresponding to the first memory space that are recorded in the nested page table are write and non-execute;
determine, based on the second conflict exception, that the second code belongs to either the internal code or the external code; and
determine, based on semantic information of the second code, that the second code belongs to the internal code.

15. The computer device according to claim 10, wherein the at least one processor is further adapted to:
construct the virtual execution environment by using a virtualization platform; and
construct the simulated execution environment by using simulator software.

16. The computer device according to claim 15, wherein the simulator software is a quick emulator (QEMU).

17. The computer device according to claim 15, wherein the virtualization platform is a kernel-based virtual machine (KVM) or Xen.

18. The computer device according to claim 10, wherein the at least one processor is further adapted to:
switch any one or more of the following content in the execution environment of the first program code: a context of a processor, memory access, or input/output (I/O) processing.

* * * * *

UNITED STATES PATENT AND TRADEMARK OFFICE
CERTIFICATE OF CORRECTION

PATENT NO. : 12,169,555 B2
APPLICATION NO. : 17/889153
DATED : December 17, 2024
INVENTOR(S) : Yuan et al.

Page 1 of 1

It is certified that error appears in the above-identified patent and that said Letters Patent is hereby corrected as shown below:

In the Claims

Claim 1: Column 37, Line 53: "executing, by the computer device, the second code m the" should read as -- executing, by the computer device, the second code in the --.

Signed and Sealed this
Tenth Day of June, 2025

Coke Morgan Stewart
*Acting Director of the United States Patent and Trademark Office*